US012680850B2

(12) United States Patent
Kuznetsov et al.

(10) Patent No.: US 12,680,850 B2
(45) Date of Patent: Jul. 14, 2026

(54) SYSTEM AND METHODOLOGY FOR EVALUATION OF DISTRIBUTED ACOUSTIC AND TEMPERATURE SIGNALS DURING WELL FLOWS WITH HETEROGENEOUS INFLOW AND OUTFLOW PATTERNS

(71) Applicant: SCHLUMBERGER TECHNOLOGY CORPORATION, Sugar Land, TX (US)

(72) Inventors: Dmitry Sergeevich Kuznetsov, Sugar Land, TX (US); Roman Vladimirovich Korkin, Sugar Land, TX (US); Maxim Andreevich Chertov, Sugar Land, TX (US); Joel Herve Le Calvez, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 271 days.

(21) Appl. No.: 18/639,670

(22) Filed: Apr. 18, 2024

(65) Prior Publication Data

US 2025/0327696 A1 Oct. 23, 2025

(51) Int. Cl.
*G01F 1/688* (2006.01)

(52) U.S. Cl.
CPC ........ *G01F 1/6882* (2013.01); *E21B 2200/20* (2020.05)

(58) Field of Classification Search
CPC .... E21B 2200/20; E21B 47/135; E21B 11/00; E21B 10/00; E21B 1/00; E21B 45/00;

(Continued)

(56) References Cited

U.S. PATENT DOCUMENTS

| | | | |
|---|---|---|---|
| 2005/0149264 A1 | 7/2005 | Tarvin et al. | |
| 2010/0230097 A1* | 9/2010 | Seaba | E21B 43/2406 166/57 |

(Continued)

FOREIGN PATENT DOCUMENTS

| | | | |
|---|---|---|---|
| CA | 2886449 C | 7/2019 | |
| JP | S61155934 A * | 7/1986 | ........ G01M 11/3145 |

OTHER PUBLICATIONS

Kragas et al. :Downhole Fiber-Optic Multiphase Flowmeter: Design, Operating Principle, and Testing, SPE-77655-MS, Paper presented at the SPE Annual Technical Conference and Exhibition, San Antonio, Texas, Sep. 2002.

(Continued)

*Primary Examiner* — Kidest Worku
(74) *Attorney, Agent, or Firm* — Kyle R. Miiller

(57) ABSTRACT

Methods and systems for managing characterization of wells using data acquisitions tools are disclosed. The data acquisition tools may be positioned in portions of wells. While positioned in the wells, the data acquisition tools may be measured. The measurements may be ingested into models and may provide, as output, inferred conditions in the portions of the wells. The models may be created using simulation systems. The simulation systems may allow for conditions that may be present in wells to be simulated, and data acquisition tools to be exposed to the simulated conditions. While exposed to the simulated conditions, the data acquisition tools may be measured to establish associations that may be used to infer conditions that may be present in wells.

31 Claims, 18 Drawing Sheets

(58) Field of Classification Search
CPC .......... E21B 47/00; E21B 49/00; E21B 34/00; E21B 35/00; G01F 9/00; G01F 5/00; G01F 19/00; G01F 1/28; G01F 1/6882; G01F 1/86

See application file for complete search history.

(56) References Cited

U.S. PATENT DOCUMENTS

| | | | | |
|---|---|---|---|---|
| 2010/0274546 A1* | 10/2010 | Zafari | ................... | E21B 37/00 |
| | | | | 166/311 |
| 2011/0071810 A1* | 3/2011 | Yeriazarian | ............. | E21B 43/12 |
| | | | | 700/282 |
| 2014/0216151 A1* | 8/2014 | Godfrey | .................. | G01F 1/704 |
| | | | | 73/152.32 |
| 2015/0233239 A1* | 8/2015 | Wang | ..................... | E21B 47/09 |
| | | | | 166/252.5 |
| 2016/0097270 A1* | 4/2016 | Pobedinski | ............ | G05B 17/02 |
| | | | | 700/275 |
| 2016/0266276 A1 | 9/2016 | Stokely | | |
| 2017/0067335 A1 | 3/2017 | Weng et al. | | |
| 2017/0145813 A1 | 5/2017 | Horesh et al. | | |
| 2020/0309982 A1* | 10/2020 | Jin | ........................... | G01V 1/50 |
| 2021/0032985 A1* | 2/2021 | Stark | ...................... | E21B 47/07 |
| 2021/0173111 A1* | 6/2021 | Therrien | .............. | E21B 47/113 |
| 2022/0098942 A1 | 3/2022 | Zhang et al. | | |

OTHER PUBLICATIONS

Molenaar et al. "MS First Downhole Application of Distributed Acoustic Sensing (DAS) for Hydraulic Fracturing Monitoring and Diagnostics" SPE-140561 Paper presented at the SPE Hydraulic Fracturing Technology Conference, The Woodlands, Texas, USA, Jan. 2011.

Jin et al. Hydraulic-fracture geometry characterization using low-frequency DAS signal, Ge Jin, Baishali Roy, Leading Edge, vol. 36, Issue 12.

Stokeley et al. "Acoustics-based flow monitoring during hydraulic fracturing," SPE-179151-MS. Paper presented at the SPE Hydraulic Fracturing Technology Conference, The Woodlands, Texas, USA, Feb. 2016.

Titov et al. "Distributed Fiber-optic Sensing Based Production Logging Investigation: Flowloop Experiments." First EAGE Workshop on Fibre Optic Sensing, Mar. 2020, vol. 2020, p. 1-5.

* cited by examiner

Surface Facility
Simulation
Section 206

Suction Pipe
270

Pump
230

Flexible Pipe
272

Fluid
Tank
220

Return Pipe
274

Control
Sections 236

Wellbore
Simulation
Section 202

Wellbore
Simulation
Section 202

Data Acquisition Tool
Insertion Section 277

Noise
Management
System 260

Wellbore
Wall Pipe
276

Simulation
Section 202

Wellbore
Wall Pipe
276

Pipe
280

Valve
232

Perforation
Simulation
Sections 212

Meter
234

Return Pipe
274

Wellbore
Simulation
Section 202

Wellbore
Wall Pipe
276

Pipe
181

Meter
234

Valve
232

Perforation
Simulation
Sections 212

Return Pipe
122

Wellbore
Simulation
Section 202

Opaque
Pipe 292

Perforation
Simulation
Section 210

Transparent
Pipe 290

Wellbore
Wall Pipe
276

Return Pipe
274

SYSTEM AND METHODOLOGY FOR EVALUATION OF DISTRIBUTED ACOUSTIC AND TEMPERATURE SIGNALS DURING WELL FLOWS WITH HETEROGENEOUS INFLOW AND OUTFLOW PATTERNS

BACKGROUND

Geological formations may host a range of resources. For example, geological formations may include trapped liquids and/or gases that may include hydrocarbons of various types. These hydrocarbons may be used for a variety of purposes.

The geological formations may also be used for other purposes. For example, undesired materials may be sequestered in the geological formations. Greenhouse gases such as carbon dioxide may be sequestered in geological formations to limit impacts of the greenhouse gases on the environment.

Further, geological formation may host exploitable resources such as geothermal energy reservoirs. Such exploitable resources may be utilized by extracting heat usable for various purposes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a method for operating a well is provided. The method may include obtaining measurement data for an optical fiber positioned in a wellbore of the well. The method may also include, predicting, using at least the measurement data and a predictive model, flow rates of fluids in the well. The predicted flow rates of fluids may include flow rates through outlets of the well, such as perforations, perforation clusters, open ports, and flow rates in different sections along the well. The method may further include using the flow rates to select at least one action. The method may additionally include performing the at least one action to facilitate the stimulation of the well.

The measurement data may include optical measurements spatially distributed along the optical fiber while a fluid flow is proximate to the optical fiber.

The optical fiber may have optical properties adapted to change with respect to the fluid flow.

The measurement data may also include a portion of optical measurements spatially distributed along the optical fiber without the simulated fluid flow.

The measurement data may be obtained by, while the optical fiber is positioned in the wellbore: sending pulses of optical radiation into the optical fiber; and measuring a response of the optical fiber to the optical pulses at different points in time.

The flow rates through the perforations may be predicted by estimating strain on the optical fiber due to flows of fluids through the outlets, which are proximate to the optical cable; and measuring the strain, and feeding the strain into the predictive model to obtain fluid flow predictions.

The predictive model may be based on a set of operational parameters for the simulation system.

The method may additionally include, prior to obtaining the measurement data: obtaining the predictive model using at least the distributed optical responses corresponding to the sets of operation parameters, the positional responses corresponding to the sets of operation parameters, and the calibration distributed optical response.

The predictive model may include a machine learning model trained to generalize (i) relationships between the distributed optical responses corresponding to the sets of operation parameters normalized to the calibration distributed optical response, and (ii) the positional responses corresponding to the sets of operation parameters.

The calibration distributed optical response may serve as a baseline for noise in an environment for the distributed optical responses corresponding to the sets of operation parameters.

In an embodiment, a non-transitory machine-readable medium having instructions stored therein, which when executed by a processor, cause the processor to perform operations for performing a method is disclosed. The operations may cause the method, as discussed above, to be performed.

In an aspect, a data processing system is disclosed. The data processing system may include a processor and memory. When the processor performs a set of instructions, the data processing system may facilitate performance of the method. The instructions may be stored on a non-transitory machine-readable medium.

In an embodiment, a simulation system for wells is provided. The simulation system may include a circulation loop for circulating a fluid through the pipes and fluid conduits simulating flows in a well with outlets and inlets; a data acquisition tool positioned with the circulation loop to interact with the fluid; a measurement tool positioned with the circulation loop to measure a fluid flow characteristics within a well while the fluid is circulated in the circulation loop; and a controller configured to obtain a distributed optical response from the data acquisition tool while the data acquisition tool is positioned in the circulation loop and the fluid is circulated through the well.

The circulation loop may include a wellbore simulation section in which the data acquisition tool may be positioned; a return section in fluid communication with the wellbore simulation section and a fluid tank; and a perforation simulation section that places a first portion of wellbore simulation section in fluid communication with a portion of the return section so that at least a portion of the fluid bypasses a second portion of the wellbore simulation section while the fluid is circulated in the circulation loop.

The circulation loop may also include a surface facility simulation section adapted to selectively establish circulations of the fluid in the circulation loop.

The data acquisition tool may include an optical fiber.

The distributed optical response may be usable to identify a distributed strain along the optical fiber, a distributed temperature along the optical fiber, and/or a distributed acoustic signal along the optical fiber. The distributed strain might be measured at different frequencies and set of strain summed over the whole frequency intervals might be provided.

The simulation system may additionally include a simulation system controller adapted to update operation of the simulation system based on sets of operation parameters. The sets of operation parameters may define at least flow rates of the fluid in the circulation loop. A first operation parameter may reduce the flow rates of the fluid to mitigate effects of the simulation system on the data acquisition tool and enable a baseline measurement of conditions impacting the data acquisition tool to be acquired. Other operation parameters may simulate conditions that may be present in a well in which data acquisition tools may be positioned.

The simulation system may also include a pump for the fluid circulation in the circulation loop with the inlets or outlets; a valves to limit a flow rate of the fluid through the inlets/outlets in the circulation loop; and a flowmeters to measure the flow rate through the individual inlets/outlets. The pump, the valves, and the flowmeters may be operably connected to and managed by the simulation system controller.

The simulation system may further include a noise management system positioned with a portion of the circulation loop to shield the portion of the circulation loop from ambient noise. The data acquisition tool may be positioned with the portion of the circulation loop during operation of the simulation system.

The simulation system may also include a heater positioned with the circulation loop to heat at least a portion of the fluid; and a temperature sensor to measure a temperature of the portion of the fluid.

The controller may be configured to obtain a distributed acoustic signal along the data acquisition tool and a distributed temperature signal along the data acquisition tool. The distributed acoustic signal maybe obtained in several frequency intervals.

The data acquisition tool may include a cable with more than one optical thread (in case of more than one thread, first, single mode, maybe used for the distributed acoustic sensing measurements, the second, multimode, for the distributed temperature sensing). The distributed acoustic signal and the distributed temperature signal may be obtained from the respective optical threads (e.g., an optical fiber). The data acquisition tool may be positioned in the circulation loop and/or outside of the circulation loop.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

Geological formations may be exploited to obtain various energy resources (e.g., hydrocarbons entrained in fluids/gases), to sequester undesired materials, to extract heat, and/or for other purposes. To exploit a geological formation, a well may be constructed to reach various portions of the geological formation. To operate the well, various properties of the well and/or the geological formation may be characterized.

Figure 1A:
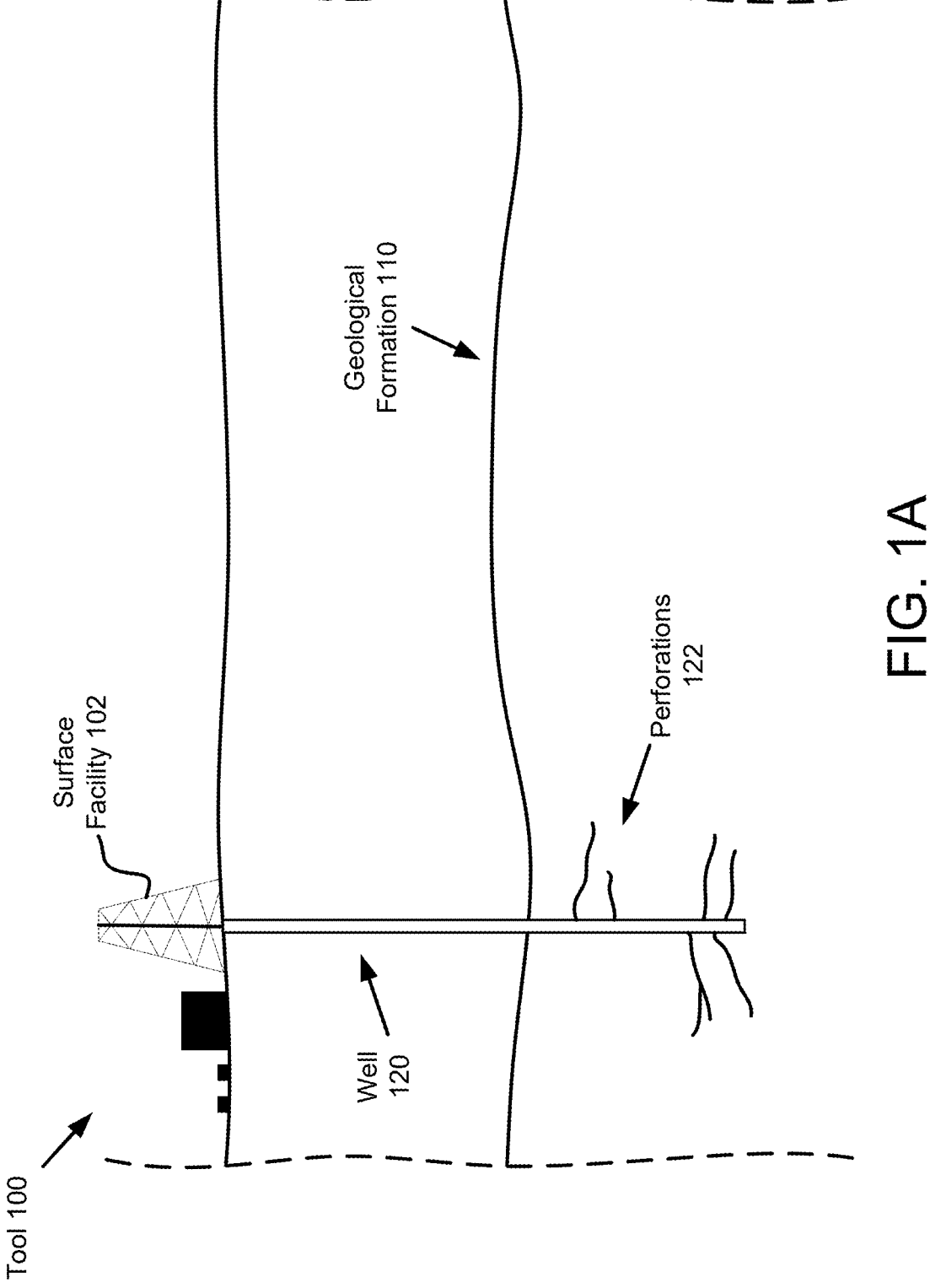
FIGS. 1A-1C show diagrams illustrating a system in accordance with an embodiment.

Turning to FIG. 1A, a diagram of geological formation 110 in accordance with an embodiment is shown. Geological formation 110 may be a portion of the Earth's crust. In FIG. 1A, geological formation 110 is illustrated as being positioned on land. However, it will be appreciated that embodiments disclosed herein may be used with respect to geological formations positioned below oceans or other bodies of water.

Geological formation 110 may be usable, for example, to sequester undesired materials (e.g., greenhouse gases such as $CO_2$), produce energy resources (e.g., hydrocarbons), extract heat, and/or for other purposes. To exploit geological formation 110, a well (e.g., 120) may be drilled to provide for physical access to geological formation 110. In this manner, materials may be removed from and/or added to geological formation 110.

To decide how to exploit geological formation 110 and/or operate well 120, information regarding the properties of geological formation 110 and/or well 120 may be collected. To do so, a tool may be used.

The tool (e.g., a data acquisition tool) may include part of surface facility 102 and various pieces of equipment that may be positioned in well 120. For example, a controller or other components for operating a data acquisition component may be positioned with surface facility 102 and various data acquisition components of the tool may be positioned in well 120. The data acquisition components may include, for example, distributed data acquisition components such as optical fibers (e.g., sensing components), and/or other types of components for obtaining information using the distributed data acquisition components.

Surface facility 102 may be a facility positioned above geological formation 110. While drawn in FIG. 1 as being positioned on land and including a derrick, the surface facility 102 may include a water born vessel such as a drill ship or other type of sea going vessel (e.g., a platform) without departing from embodiments disclosed herein.

Surface facility 102 may include, for example, (i) control systems for other components (e.g., to manage operation of a drill string), (ii) fluids (e.g., drilling mud, water, gases such as carbon dioxide) usable to form and characterize well 120/geological formation 110, (iii) various assemblies and/ or components usable with other assemblies (e.g., controllers of the data acquisition tools), (iv) drill pipe and/or other components for well development, (v) completion components such as cement for completion of well 120, (vi) power systems, (vii) storage tanks for various fluids used in well construction/characterization, and/or other fluids, systems, etc. for well development.

In general, embodiments disclosed herein relate to methods and systems for stimulating wells, obtaining information to aid in the modeling of geological formations and/or wells, and/or obtaining information usable to grade or characterize wells and/or geological formations for various uses.

To obtain information regarding wells and geological formations, after well are drilled, various data acquisition tools may be positioned in the wellbores. The data acquisition tools may include sensing components (e.g., optical fibers) usable to sense conditions present in the well, conditions during various downhole operations, during production of the well, etc.

Figure 1B:
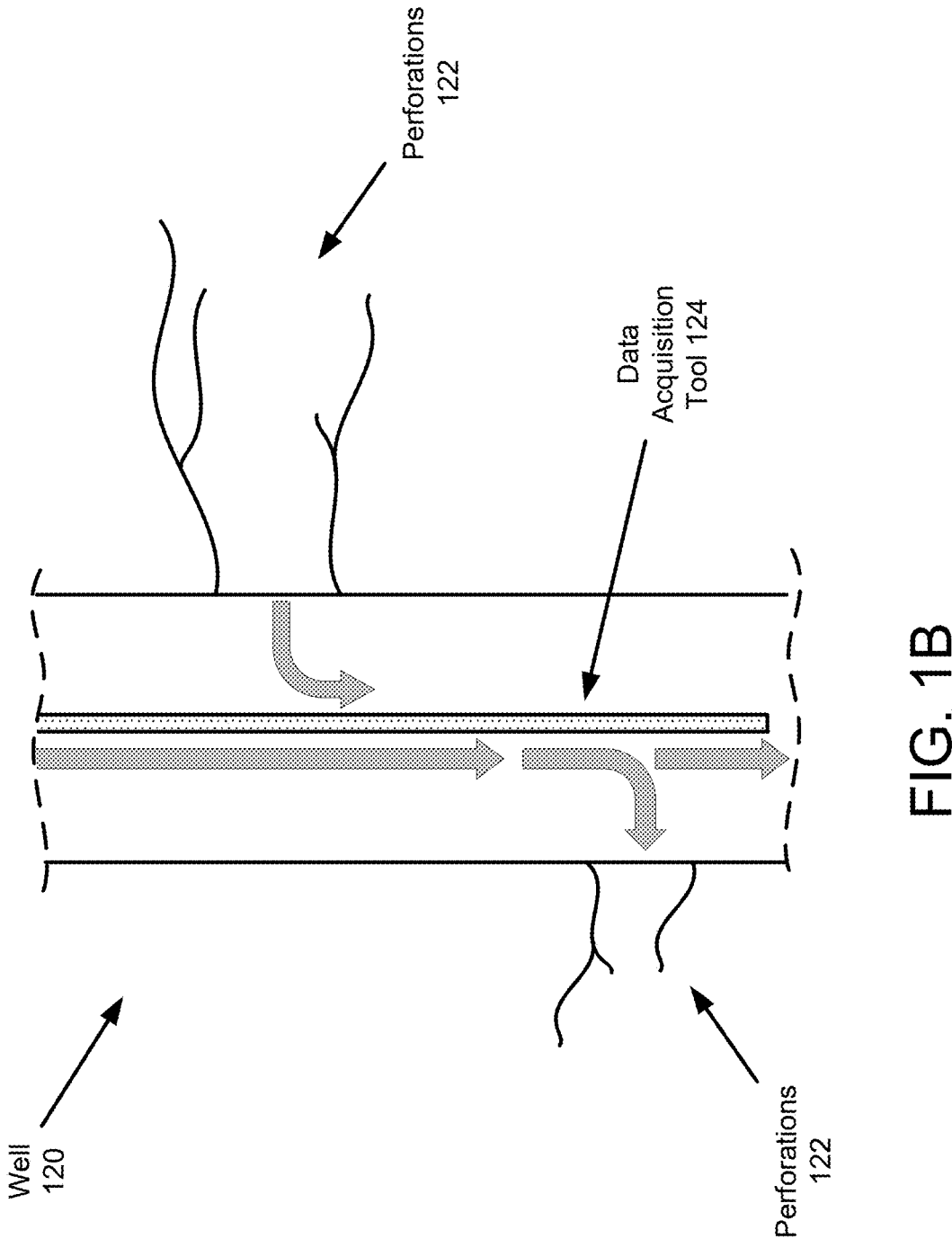

For example, turning to FIG. 1B, a diagram of a portion of well 120 in accordance with an embodiment is shown. In the diagram, dashed lines indicate that the structures shown may continue beyond the dashed lines.

To obtain information regarding conditions present in the portion of well 120, data acquisition tool 124 may be at least partially positioned in the portion of well 120. For example, a sensing component such as an optical fiber, a distributed array of temperature sensors, and/or other type of component capable of measuring distributed conditions may be positioned in the portion of well 120. When so positioned, various conditions proximate to the sensing component may be measured (e.g., in the context of an optical fiber, by injecting electromagnetic radiation and measuring responses to the optical radiation such as reflections from various portions of the optical fiber). The measurements of the sensing component may be used to infer local conditions proximate to different portions of the sensing component.

For example, the sensing component may be one or more fiber optic cables (e.g., single mode, multimode, etc.). The fiber optic cables may have properties that change based on the local conditions. The local conditions may place various forces on fiber optic cables that cause the local properties of the fiber optic cables to change. Consequently, when the fiber optic cables are measured (e.g., injecting optical radiation pulses into an end of a fiber optic cable and measuring photons phase shift), various portions of the optic fiber may enable the local properties in well 120 to be identified. The local properties of the fiber optic cable may first be inferred based on the measurements, and then be used to infer local conditions in the well such as, for example, flows of fluids (e.g., quantitative assessments such as flow rates through the perforations), temperatures of fluids distributed in the well, and/or other conditions in the well.

To enable the measurements of optic fibers to be used to infer both local properties of the optic fiber and corresponding conditions in the well, a simulation system may be utilized. The simulation system may enable conditions that may occur in a well to be reproduced in a controlled manner. Data acquisition tools (e.g., which may include optical fibers) may be exposed to the simulated conditions. While exposed to the simulated conditions, the data acquisitions tools may be measured to establish relationships between measurements and simulated conditions in wells. Models may be established using these established relationships that enable measurements of data acquisition tools placed in wells to be used to infer the conditions in the well.

For example, in FIG. 1B, consider an example scenario where various flows of fluids (i) along the wellbore, and (ii) into/out of perforations 122 along the wellbore are present. In FIG. 1B, the example fluids flows are shown using oversized arrows. These flows of fluid may apply various forces to varying portions of data acquisition tool 124. Consequently, the optical properties of these portions of data acquisition tool 124 may change based on the applied forces. While the forces are applied, measurements of data acquisition tool 124 may be recorded (e.g., as "measurement data"). The measurement data may then be ingested by a model based on previously established relationships obtained from the simulation system. The model may output information (e.g., "inferred conditions") regarding the conditions in the well based on the measurement data. In this example, the output information may be inferred flows of fluids into/out of perforations, etc.

The inferred flow rates may be quantitative in nature. For example, the inferred flow rates may be for specific flow rates as opposed to mere qualitative assessment (e.g., there is flow in a particular direction without being able to quantify the flow). By facilitating quantitative assessment of downhole conditions, subsequent development and use of the well may be improved. For example, quantitative assessment may enable subsequent operations on and/or operation of a well to be more likely to meet operational goals. Refer to FIGS. 2A-3E for additional information regarding simulation models, establishing relationships using simulation models, and using the relationships to infer well conditions in wells.

Figure 1C:
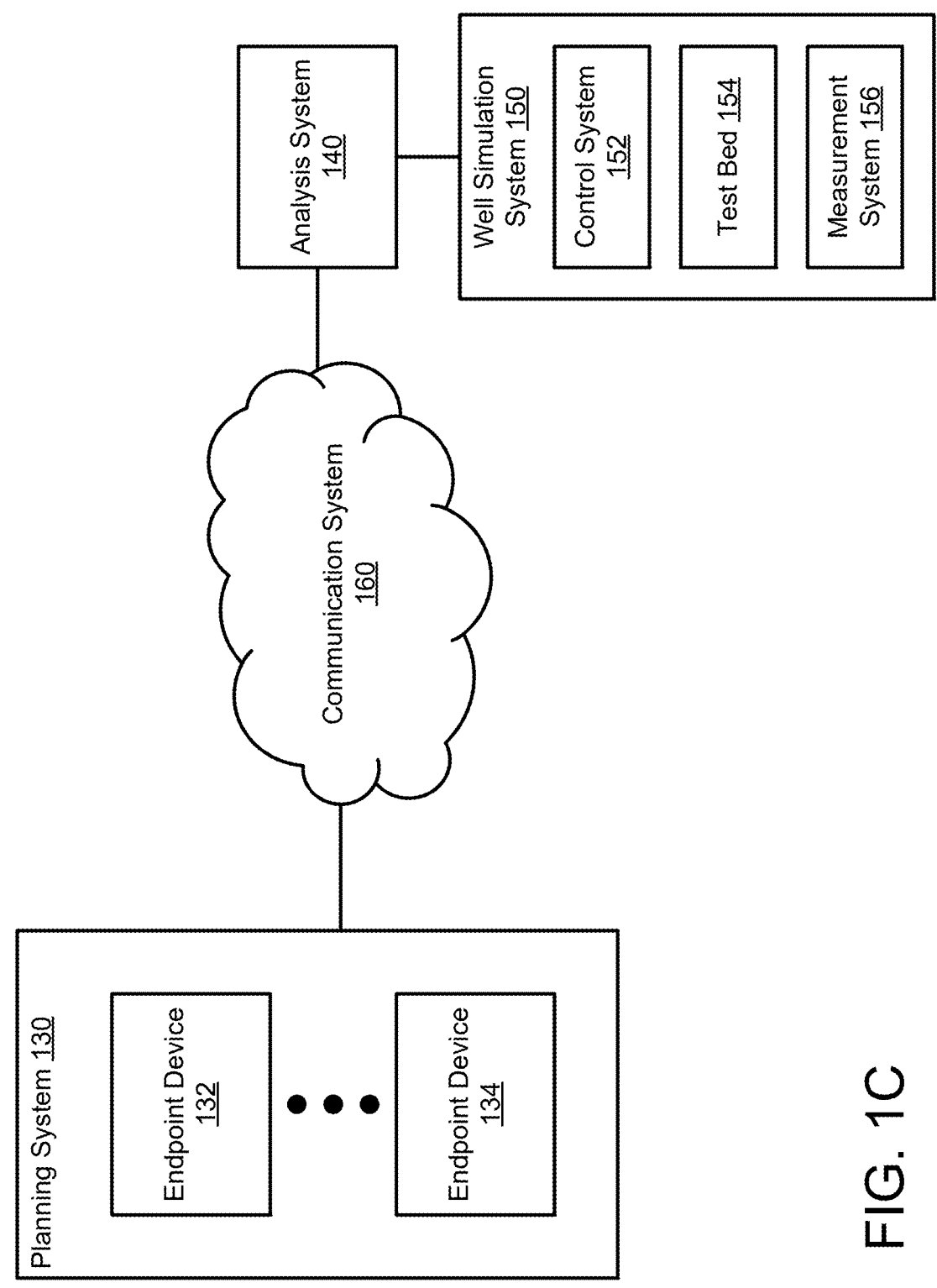

Once the inferred conditions in the well are obtained, a well model may be updated and/or generated. The well model may be used to identify the optimal settings of the data acquisition parameters to meet certain goals (e.g., perform more accurate measurements, mitigate risk of signal saturation, etc.). Refer to FIG. 1C for additional information.

The aforementioned process may be used during a variety of portions of the lifecycle of a well. When the well is drilled, the perforations are created to connect the wellbore and the reservoir. Then the well may be stimulated.

However, due to the variation of the properties of the geological formation, structure of the well, structure of the perforations, and/or other factors, the generated perforations may result in unexpected distributions of flows of the fluid through the clusters and perforations within one cluster during the stimulation. Such distributions of flows of fluid in different fractures may be undesirable because the normally the uniform distribution of the stimulation fluid and especially the uniform distribution of the proppant along the stages, i.e. between the clusters because poor uniformity causes lower production.

To monitor and/or address such outcomes, data acquisition tools may be positioned in the well prior to, during, and/or after hydraulic fracturing is performed. By monitoring during these various phases, the flow of fluid along the wellbore and into the geological formation may be quantitatively assessed. Accordingly, adjustment to the hydraulic fracturing process and/or subsequent use of the well may be made to account for actual flow rates likely to be present in the well's clusters/perforations.

In another example, after a well has been completed and production from the well that may include hydrocarbons begins, data acquisitions tools positioned in the well may be used to identify flow rates of the produced materials from various clusters/fractures of the well. For example, the positioned data acquisition tools may allow for production rates from various clusters, fractures, and/or other defined portions of the well to be identified. In such scenarios, the flow of fluid from the perforations, into the well, and toward the surface may apply similar measurable forces to the data acquisition tools. Consequently, the flow rates may be quantitatively assessed to identify relative performance of the well, to establish models usable to guide subsequent operation of the well, etc.

While illustrated in FIGS. 1A-1B with a simple well, it will be appreciated that that methods and systems disclosed herein may be applicable to a wide variety of wells. For example, in horizontal wells, significant (e.g., 10-70) numbers of stages may be present. Each stage may include a wellbore section and some number (e.g., 3-10) of clusters of perforations (e.g., 3-12). To utilize such wells, various stimulation procedures (e.g., propped hydraulic fracturing, acid treatments, acid fracturing, etc.) may be performed. These stimulation procedures may fracture the surrounding rock thereby placing the wellbore in fluid communication with portions of the geological formation. Accordingly, fluid flow between the wellbore and the portions of the geological formation may occur.

To maintain and/or control the fluid distribution between the clusters along the stage, additional procedures may be performed. These procedures may include, for example, change the proppant concentration, slurry rate, pumping chemical diverters, etc. The proppant is deposited into the fractures created during fracturing.

To take the modified fluid flow distributions into account, the data acquisition tools may be used to identify flow rates of fluids into and/or out of the clusters. The identified flow rates may be used, for example, to identify desirable stimulation for the well, to identify how to operate the well in a manner that results in a desirable outcome, to identify how to take other measurements of the well, etc.

Turning to FIG. 1C, a block diagram of a modeling system in accordance with an embodiment is shown. The modeling system may be used to establish stimulation plans for the well treatment strategy and/or measurements settings optimization, to establish relationships usable to infer well conditions using measurements from downhole tools (e.g., data acquisition tools), and/or for other purposes. Among measurements settings optimization the following parameters might be optimized: gauge length, sample rate, low and high boundaries in the frequency band energies, etc. Among the stimulation treatment strategy, the following parameters might be changed: pumping rate, proppant concentration profile, total amount of proppant/fluid pumped, pumping the chemical diverters to control fluid flow and redirect it to specific zones within the reservoir. To provide the above noted functionality, the modeling system of FIG. 1C may include planning system 130, analysis system 140, well simulation system 150, and communication system 160. Each of these components is discussed below.

Planning system 130 may facilitate planning for the well stimulation strategy to accomplish various goals. To do so, planning system 130 may gather and provide information regarding a well to analysis system 140. The information may have been obtained using a variety of tools such as a data acquisition tool (e.g., may include any number of optical fibers, controllers for measurement, etc.), micro-imager (e.g., measures resistivity along the wellbore), sonic tools (e.g., acoustic, vibration or other sounds based measurements), spectroscopic tools (e.g., measurements in several energy windows of the gamma rays emitted by the source and scattered in the formation or gamma rays produced from neutron capture or inelastic scattering), and/or other types of downhole tools.

Based on at least some of the provided data, analysis system 140 may return information regarding conditions in and/or proximate to a well. The information may include, for example, fluid flow rates into/out of perforations, and/or other types of information regarding the conditions in and/or proximate to a well.

Planning system 130 may use this information to define a stimulation strategy plan, and/or change an existing stimulation strategy plan. For example, planning system 130 may use fluid flow information inferred using analysis system 140 to define a goal stimulation strategy. The strategy may be defined in an automated manner, semi-automated, and/or manual manner.

Returning to the discussion of analysis system 140, analysis system 140 may utilize one or more models for inferring information regarding the conditions. The models may be based on information obtained from well simulation system 150.

Well simulation system 150 may be a physical system for simulating conditions that may be present in a well. Simulation system 150 may facilitate simulation of various conditions that may be present in a well throughout various aspects of the lifecycle of the well including, for example, hydraulic fracturing, production, etc. Well simulation system may include control system 152, test bed 154, and measurement system 156. Each of these components is discussed below.

Test bed 154 may be a physical system for creating conditions that may be present in a well, and exposing sensing components of data acquisition tools to the created conditions. Test bed 154 may include various (i) fluid flow directing components such as sections of pipe, (ii) various fluid flow creation components such as pumps, (iii) pressure/flowrate regulation and/or measurements components such as valves and meters, (iv) simulation components used to simulate presence of well features (e.g., perforations) such as additional pipe sections branching off from other pipe sections (e.g., that may simulate wellbores), (v) fluid tanks, (vi) thermal conditioning components (e.g., heaters), (vii) isolation components such as vibration shielding materials, and/or other types of components for establishing conditions representative of that which may be present in a well. Refer to FIGS. 2A-2G for additional details regarding test bed 154.

Control system 152 may control various components of test bed 154. For example, control system 152 may take, as input, a set of parameters regarding a condition that may exist in a well during stimulation. Any number of sets of parameters may be defined, for example, by a subject matter expert. The parameters may define, for example, pumping pressure, slurry rates, proppant concentration, etc.

Once input, control system 152 may modify the operation of various active components of test bed 154 to match the condition present in test bed 154 to the conditions specified by the parameters. For example, control system 152 may set (i) pumping rates, (ii) heater heating rates, (iii) valve positions to change flow rates, (iv) define transient valve responses (e.g., may initially not be very restrictive but may close over time to reduce flow rates to simulate geologic formation responses to fluid flow), etc. Likewise, control system 152 may use pressure/flow rate/temperature meters positioned throughout test bed 154 to validate the actual conditions present in test bed 154. Accordingly, control system 152 may further modify operation of the active components until the measured quantities match those specified by the parameters.

Once the conditions in test bed 154 match the conditions defined by the parameters, control system 152 may cooperate with measurement system 156 to obtain data using a data acquisition tool positioned with test bed 154. For example, if the data acquisition tool includes an optical fiber, then the optical fiber may be positioned in a portion of test bed 154 that is simulating conditions in a well. While exposed to simulated conditions, measurement system 156 may (i) activate the sensing components, and (ii) measure the activated sensing components. These measurements along with the parameters that define the operation of test bed 154 may be stored. This process may be repeated for any number of sets of parameters to obtain corresponding measurements of data acquisition tools.

Once obtained, the relationships between these sets of parameters and corresponding measurements of the data acquisition tools (e.g., in aggregate "training data") may be used to generate a model. For example, a machine learning model, decision tree, regression model, or other inference model may be trained using the training data to generalize the relationships beyond those discretely defined within the training data. Refer to FIG. 3B for additional details regarding model creation and retention.

The resulting model may be used by analysis system 140 to infer the conditions in the well based on measurements of data acquisition tools. For example, the sets of parameters may include the total flow rate of the fluid pumped, proppant concentration, optical cable response along the wellbore, etc. The model may generalize the measured relationships from well simulation system 150 and thereby allow for various flow rates of fluid, and/or other parameters to be obtained as a function of simulation/measured responses of sensing components of data acquisition tools while positioned in real wells. Refer to FIG. 3C for additional details regarding use of models to infer conditions present in wells.

Returning to the discussion of planning system 130, to provide its functionality, planning system 130 may include any number of endpoint devices 132-134. The endpoint devices may include various types of computing devices used by personnel working on completion of the wells.

When providing their functionality, any of (and/or components thereof) planning system 130, analysis system 140, and well simulation system 150 may perform all, or a portion, of the actions and methods illustrated in FIGS. 2A-4.

Any of (and/or components thereof) planning system 130, analysis system 140, and well simulation system 150 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

Any of the components illustrated in FIG. 1B may be operably connected to each other (and/or components not illustrated) with communication system 160. In an embodiment, communication system 160 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1B as including a limited number of specific components, a system in accordance with an embodiment may include fewer, additional, and/or different components than those illustrated therein.

Figure 2A:
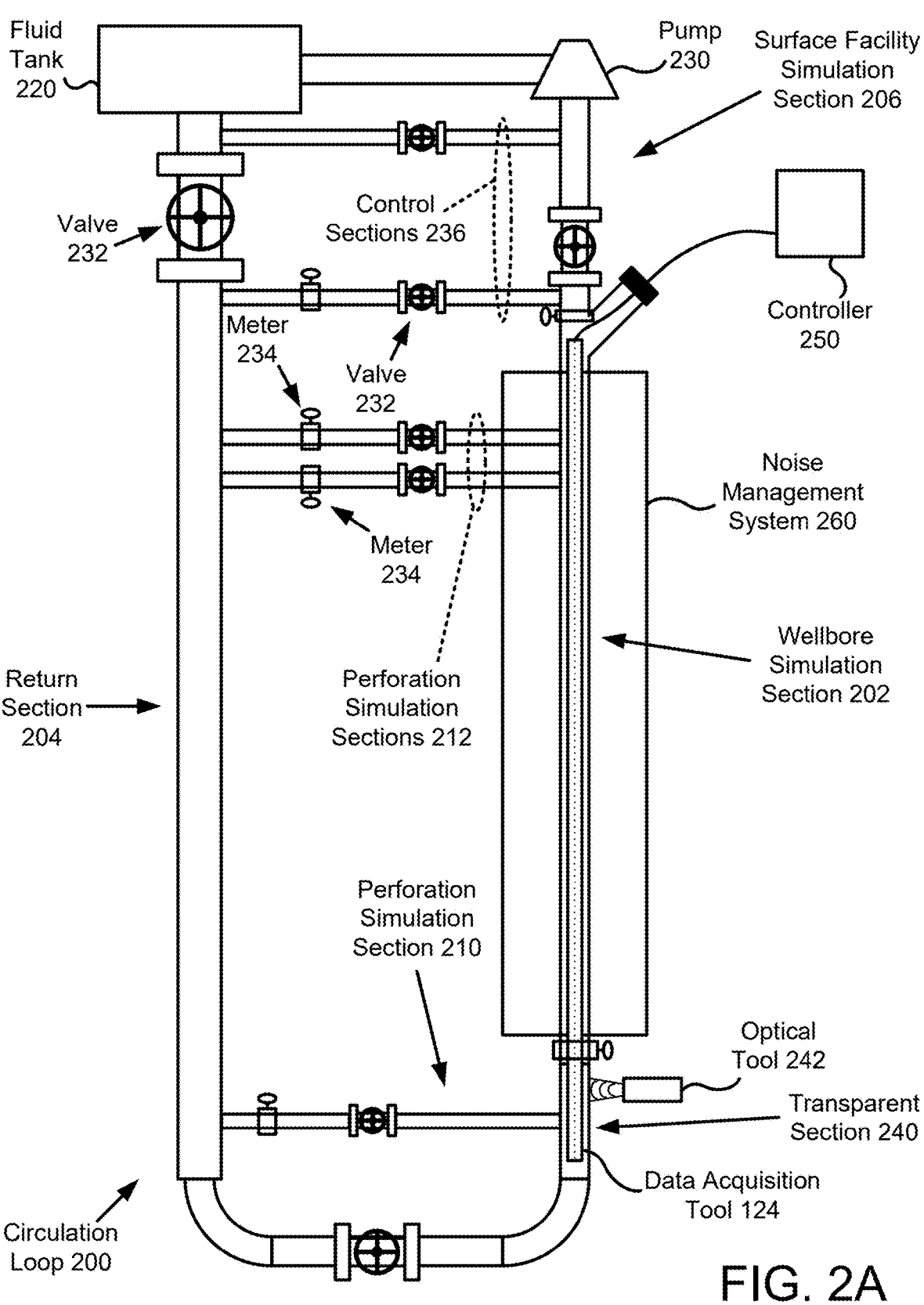
FIGS. 2A-2B show schematic diagrams illustrating a simulation system of the system in accordance with an embodiment.
Figure 2B:
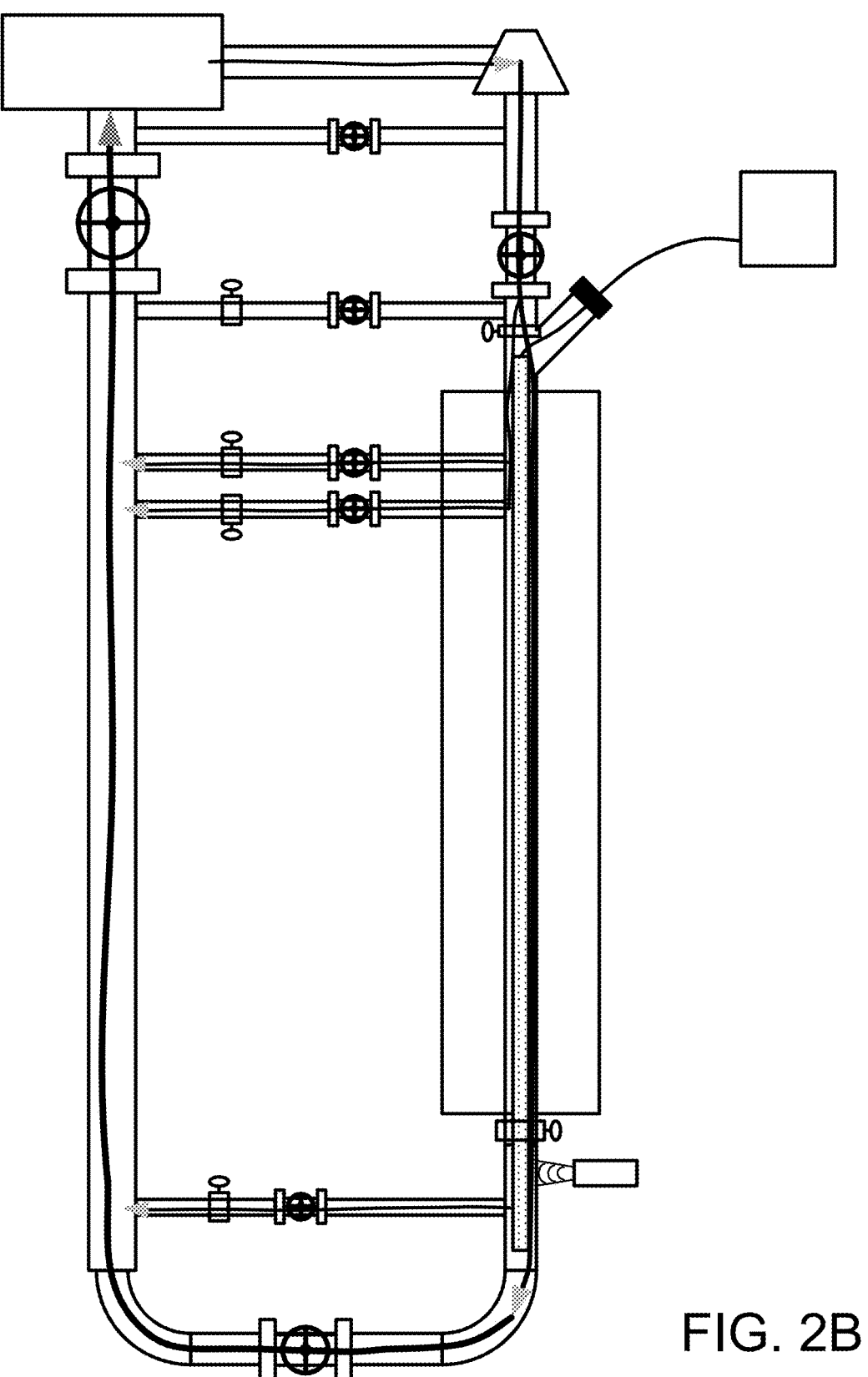

To further clarify embodiments disclosed herein, FIGS. 2A-2G show diagrams illustrating portions of well simulation system 150 in accordance with an embodiment. In FIGS. 2A-2B, schematic illustrations of portions of well simulation system 150 in accordance with an embodiment is shown. In FIGS. 2C-2G, perspective views of example implementations of the portions of well simulation system 150 in accordance with an embodiments are shown.

Turning to FIG. 2A, a first schematic diagram illustrating a portion of well simulation system 150 in accordance with an embodiment is shown. As discussed above, well simulation system 150 may facilitate recreation of various conditions that may be present in a wellbore and to which data acquisition tools may be exposed.

For example, the clusters, proppant, diversion materials, and/or other materials in a well may create a particular flow pattern of fluids into/out of various perforation clusters. The simulation system may include various components usable to recreate this fluid flow pattern.

To recreate these conditions, well simulation system 150 may include circulation loop 200. Circulation loop 200 may be a closed (or partially open) loop through which a fluid may flow. The flow of the fluid may be controlled to simulate conditions present in wells. The fluid flowed through the loop may be any type of fluid. It will be appreciated that a fluid may include gases, liquids, and/or solid materials entrained in the gases and/or liquids (and/or otherwise carried). Refer to FIG. 2B for an example of a flow of fluid in circulation loop 200.

To facilitate flow of the fluid, circulation loop 200 may include wellbore simulation section 202, return section 204, surface facility simulation section 206, perforation simulation sections (e.g., 210-212), and control sections 236. It will be appreciated that the components of these sections do not represent actual components in a well. However, the components may be used to recreate conditions (e.g., flow patterns) that may be present in the well. Each of these sections is discussed below.

Wellbore simulation section 202 may be a section of circulation loop 200 that at some level simulates conditions (or facilitate simulation of such conditions) that may be present in a well (such as local velocities in the perforations, perforations diameters, etc.). To do so, wellbore simulation section 202 may include a pipe through which a fluid may flow. At one end of the pipe, a multi-way section (e.g., a Y-section) of pipe may facilitate both flowing of the fluid into the pipe as well as insertion of data acquisition tools (e.g., 124, draw with dashed fill for clarity). Once the data acquisition tool is inserted, cabling from the data acquisition may be positioned through a bulkhead or other type of seal that seals the pipe. The cable may connect to controller 250 which may be used to measure data acquisition tool 124, and record the measurements.

A noise management system (e.g., 260) may be positioned with wellbore simulation section 202. Noise management system 260 may at least partially isolate wellbore simulation section 202 from ambient noise, and/or attenuate the ambient noise. Noise management system may include, for example, sandbags for the possible standing waves suppression, a box filled with stiffed rock, and/or other materials that may dissipate sound and vibrations. The noise control system also includes loops with an increase or decrease in diameter to generate additional parasitic signals caused by pulsations occurring in the vicinity of these diameter increases/decreases.

Returning to the discussion of wellbore simulation section 202, at least a portion of the pipe in noise management system 260 may be exposed. For example, the pipe may extend beyond the box. The extended portion of the pipe may allow for information regarding the position and movement of data acquisition tool 124 to be obtained. For example, the extended portion of the pipe may be transparent (entirely or in part, may be translucent). Optical tools (e.g., high speed camera systems) may be positioned with the transparent section (e.g., 240) of the pipe. The optical tools may be used to identify the position and/or movement of data acquisition tool 124.

Wellbore simulation section 202 may be connected to return section 204. Return section 204 may return the flows of fluid from wellbore simulation section 202 and/or other sections to surface facility simulation section 206.

Return section 204 may include a pipe connected to the pipe of wellbore simulation section 202 and/or other sections. Return section 204 may or may not be isolated from the ambient environment, similarly to wellbore simulation section 202.

Return section 204 may be connected to surface facility simulation section 206. Thus, the flow of fluid may be recirculated along the flow loop.

To provide its functionality surface facility simulation section 206 may include fluid tank 220 and pump 230. Fluid tank 220 may store fluid for future pumping through circulation loop 200. For example, fluid tank 220 may include a tank or other fluid storage structure.

Pump 230 may circulate the fluid from fluid tank 220. Pump 230 may be any type of pump for circulating the fluid. Fluid tank 220 may be connected to pump 230, which may in turn be connected to wellbore simulation section 202 via various sections of pipe.

To simulate the impact of the number and type of the perforations on wells, various portions of wellbore simulation section 202 may be in fluid communication with return section 204 via various perforation simulation sections (e.g., 210-212). Each of these sections may include fluid flow control and measuring components.

Any of the perforation simulation sections (e.g., 212) may be grouped to simulate a perforation groups. The spacing of the perforation simulation sections may correspond to distances between perforations in wellbores.

Different perforation simulation sections may be positioned at different positions along the length of wellbore simulation section 202 to simulate different well completions.

The perforation simulation sections may be connected to the return section and wellbore simulation section using T-junctions or other types of multi-way pipe sections.

At least one perforation simulation section 210 may be positioned with respect to an end of data acquisition tool 124, and may include a portion of transparent pipe much like transparent section 240. The position of the perforation simulation section 210 may allow for fluid flows in the circulation look to influence the position of a portion of the data acquisition tool. For example, fluid flowing out of wellbore simulation section 202 and into perforation simulation section 210 may tend to pull data acquisition tool 124 toward and/or into perforation simulation section 210. The physical positioning of the portion of the data acquisition tool based on these forces may also be recorded with optical tool 242 and incorporated into subsequently created models.

To control flow of fluid through circulation loop, various valves (e.g., 232) and meters (e.g., 234) may be positioned with different sections of circulation loop 200. The valves, while shown in the figures as being manual, may be computer controlled valves. The computer controlled valves may be used to establish dynamic flow conditions in wellbore simulation section 202. By doing so, similar fluid flow distributions that may be present in a well may be recreated in the simulation system. For example, the perforations, reservoir structure, and other factors may limit flow through the perforations. The valves of the simulation system may be used to establish similar flow rates to simulate fluid flow distributions.

The meters 234 may sense flow rates and/or pressures at various locations in circulation loop 200. For example, meters may be placed with the perforation simulation sections, wellbore simulation section 202, and/or other sections of circulation loop 200. The output of meters 234 may be used to guide control of the values to established conditions inside of wellbore simulation section 202. Like the valves, while not present in a well, the flow meters may be used to simulate fluid flow distributions.

In addition to the valves and meters, control sections 236 may also be used to control the flows/pressures of fluid in wellbore simulation section 202. The control sections may connect some portions of pipe downstream of pump 230 to return section 204. These sections may be used by the simulation system to tune the pressure and/or flow rates of fluid in wellbore simulation section 202.

While not shown, the active components (e.g., pump 230, mixer, blender, optical tool 242, controller 250, etc.) of the simulation system may be operably connected to and controlled by control system 152. For example, these components may be operably connected to a breakout box which, in turn, may be operably connected to any number of computers used to implement the control system 152. Software hosted by control system 152 may select the operating modes of these active components, and may use information provided by the active components to refine the operating mode to recreate conditions (e.g., flow patterns due to clusters, proppant, diversion materials, etc.) likely to be found in a well in wellbore simulation section 202. Additionally, when so created control system 152 may control controller 250 and/or optical tool 242 to characterize data acquisition tool 124 while exposed to these conditions.

For example, turning to FIG. 2B, a diagram similar to the diagram shown in FIG. 2A is shown. In FIG. 2B, the element numbers have been removed for clarity. In FIG. 2B, example flows of fluid in accordance with an embodiment are shown. These flows of fluid in the simulation system may be created by (i) operating the pump in a manner that pumps fluid in a path as shown by the yellow arrows (e.g., from the reservoir, into the wellbore simulation section 202, through various perforation simulation sections, and back to the reservoir via the return section) and returned via the path highlighted by the blue arrow, and (ii) setting constrictions that limit the flow and establish expected pressures by actuating various valves. Once set, distributed measurements from the simulation system may be taken to establish relationships between flow patterns and the measurements. It will be appreciated that the illustrated fluid flows are merely exemplary and other fluid flows may be present without departing from embodiments disclosed herein.

To establish relationships between different conditions (e.g., flow patterns in the simulation system) and measurements obtained from a data acquisition tool positioned in and exposed to the different conditions created in the simulation system, the operation of the valves, pump, and/or other components may be set. For example, to measure how the data acquisition tool responds under dynamic conditions which may occur in the field, control system 152 may modify the operation of the valves in the perforation simulation sections over time to create flow patterns in the simulation system that are similar to those that occur in the field.

While not shown, the circulation loop may also include other types of active and/or passive components such as, for example, heat exchangers to heat/cool portions of the flow of the fluid, elastic piping which may be used to simulate dynamic responses, additional pumps to simulate different flow patterns, inserts for the wellbore simulation section to simulate presence of chokes or other structures in the wellbore, etc.

Lastly, while described as being characterized while conditions in a well are simulated, the data acquisition tool may also be characterized while the various active components are inactive or at reduced activity states. Doing so may allow for a baseline level of noise to be identified. The baseline level may then be used as calibration to allow for background levels of noise in characterizations of data acquisition tools as exposed to simulated well conditions to be compensated for in subsequent modeling.

Returning to the discussion of example components that may be present in a test bed, FIGS. 2C-2G show illustrations of example implementations of portions of a test bed in accordance with an embodiment.

Figure 2C:
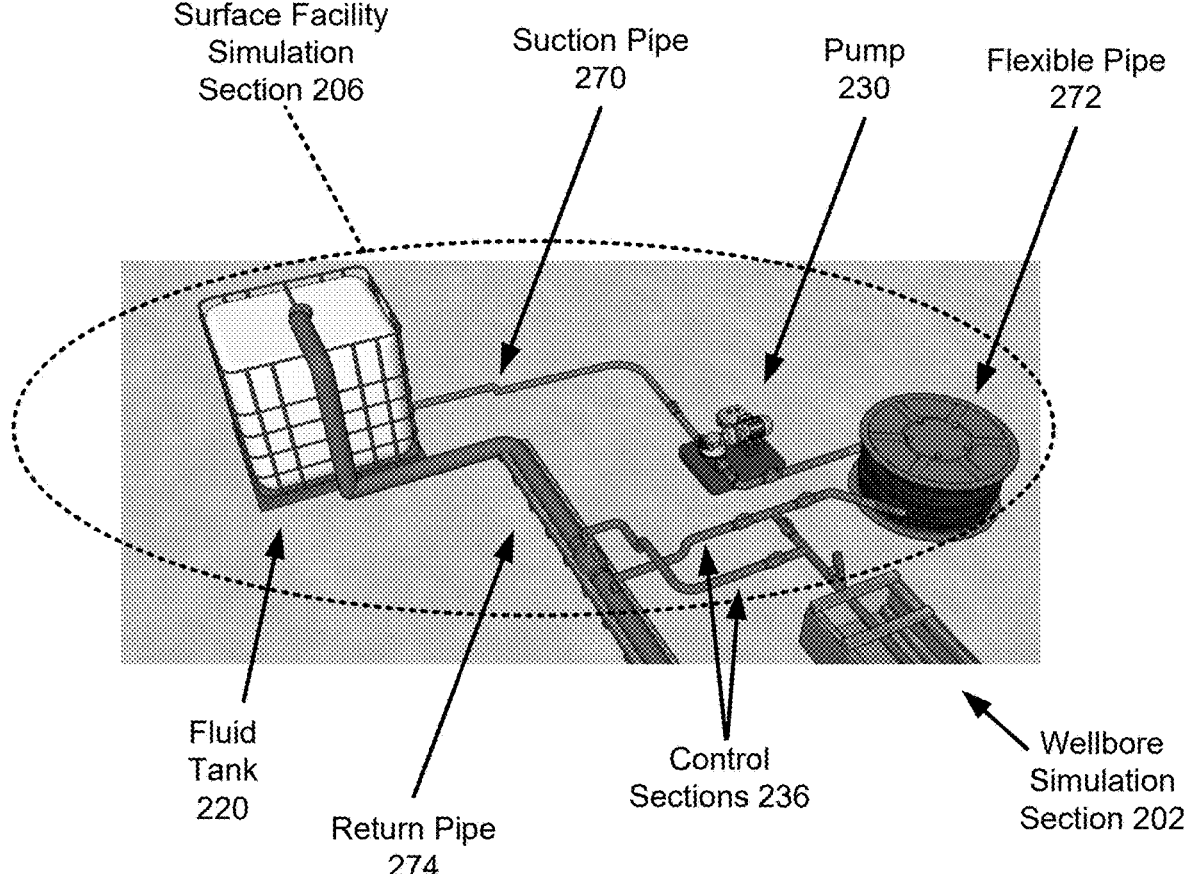
FIGS. 2C-2G show isometric diagrams illustrating portions of the simulation system in accordance with an embodiment.

Turning to FIG. 2C, a first diagram of a portion of a test bed in accordance with an embodiment is shown. The first diagram may illustrate an example implementation of surface facility simulation section 206.

Surface facility simulation section 206 may include fluid tank 220 (e.g., a tank for storing fluids), pump 230 for pumping fluid from fluid tank 220 and around the circulation loop, control sections 236, and various sections of pipe (e.g., 270, 272, 274).

Any of the sections of pipe may be implemented with rigid or flexible pipe that allows for a circulation loop to be established.

Suction pipe 270 may connect an upstream inlet of pump 230 to fluid tank 220 so that fluid from fluid tank 220 is drawn into pump 230 while pump 230 is operated.

Figure 2D:
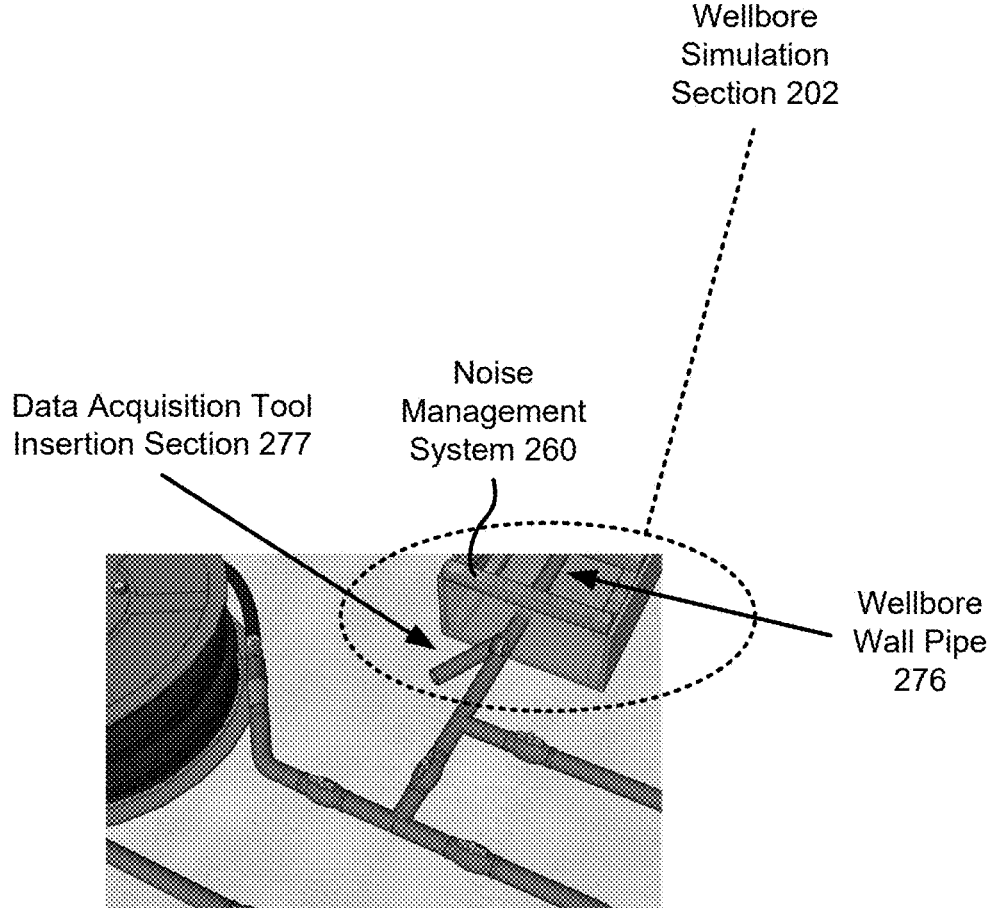

Flexible pipe 272 may connect a downstream exit of pump 230 to other portions of pipe (e.g., wellbore wall pipe 276), further described with respect to FIG. 2D. Flexible pipe 272 may be flexible to allow for various connectivity options for the other portions of pipe to be available for use in establishing various well conditions.

Return pipe 274 may return fluid to fluid tank 220 after circulating through the circulation loop.

To manage pressures and flow rates in the circulation loop, various control sections 236 may connect the pipe leading to wellbore simulation section 202 to return pipe 274. The control sections may include vales and meters to facilitate adjustment of both pressures and flow rates in wellbore simulation section 202.

Turning to FIG. 2D, a first diagram of a second portion of a test bed in accordance with an embodiment is shown. The second diagram may illustrate an example implementation of wellbore simulation section 202.

To simulate conditions that may be present in a well and characterize data acquisition tools exposed to these conditions, wellbore simulation section 202 may include wellbore wall pipe 276, data acquisition tool insertion section 277, noise management system 260, and other components discussed with respect to other figures.

Wellbore wall pipe 276 may include a section of rigid pipe positioned in noise management system 260 (e.g., may include a sand box or other acoustic management system). Wellbore wall pipe 276 may be connected to data acquisition tool insertion section 277. Wellbore wall pipe 276 may simulate a wellbore of a well.

Data acquisition tool insertion section 277 may include a Y-section of pipe used to (i) direct fluid flow from the surface facility simulation section into wellbore wall pipe 276, and (ii) provide for insertion and removal of data acquisition tools from wellbore wall pipe 276. For example, one portion of the Y-section may be connected to the surface facility simulation section and the other portion of the Y-section may include a bulkhead to reversibly seal the other portions and allow for cabling passthrough (e.g., to activate the data acquisition tool and measure corresponding responses).

Figure 2E:
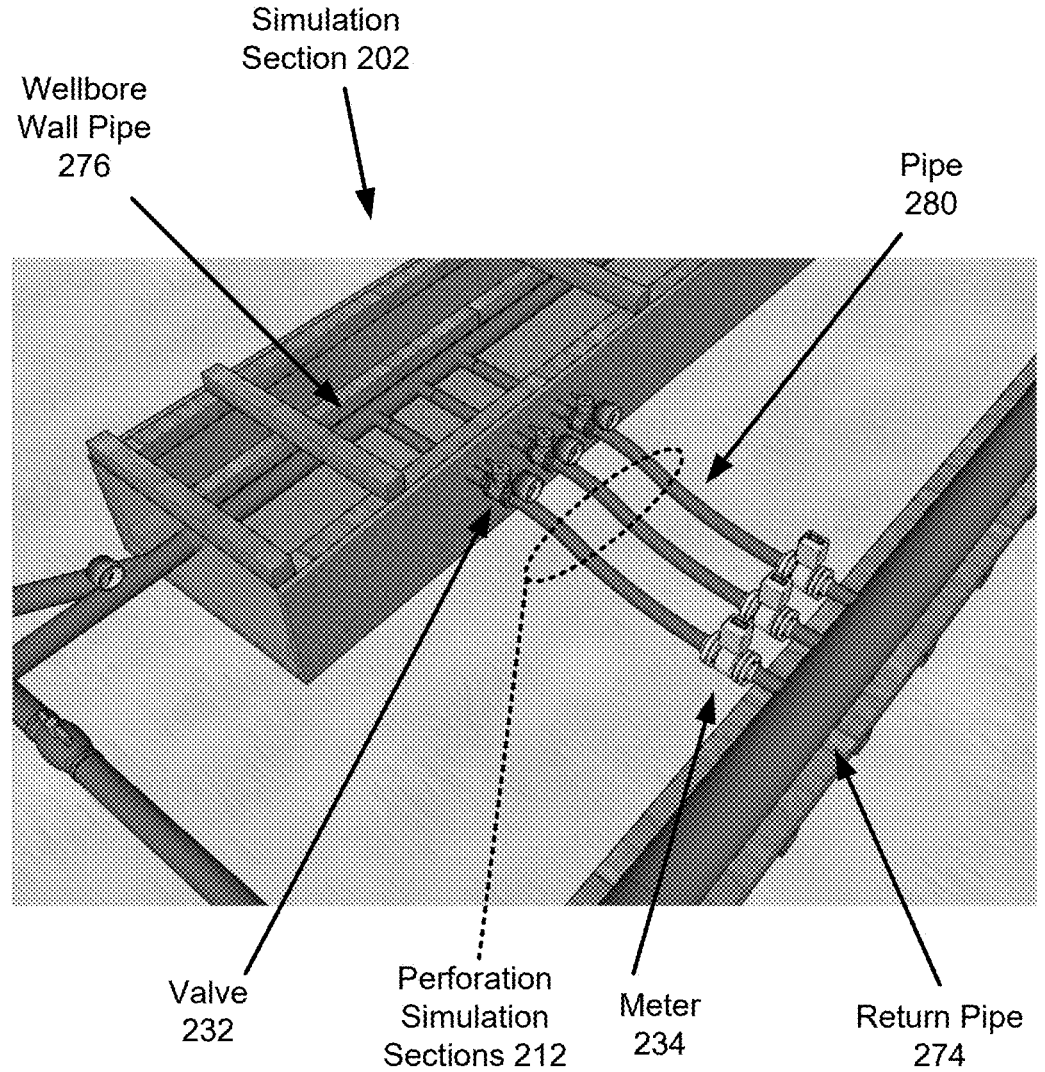
Figure 2F:
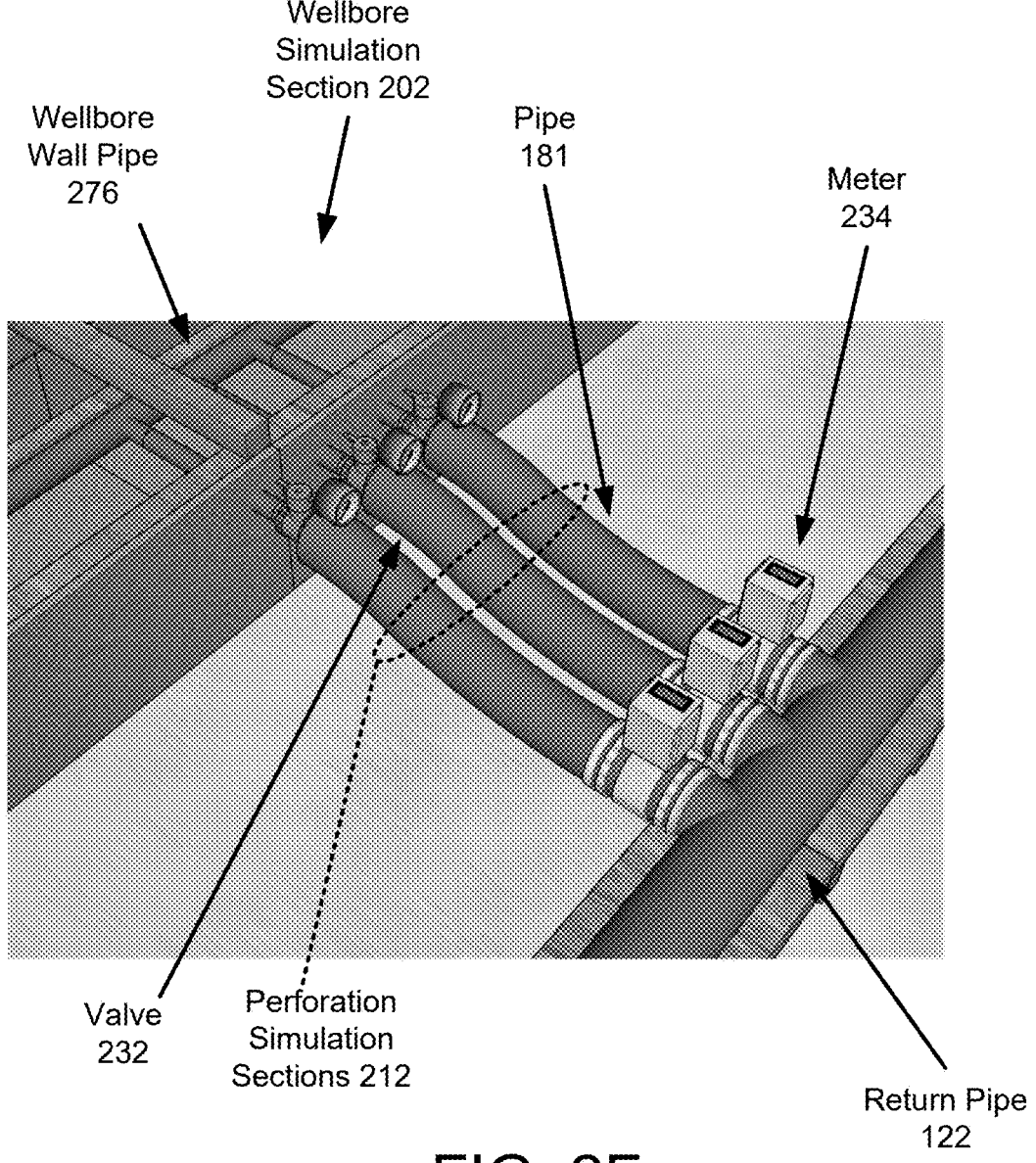

Turning to FIG. 2E, a second diagram of the second portion of a test bed in accordance with an embodiment is shown. The second diagram of the second portion may illustrate another portion of the example implementation of wellbore simulation section 202 shown in FIG. 2D.

To adjust the conditions inside of wellbore wall pipe 276 to simulate conditions within a well, any number of perforation simulation sections 212 may connect portions of wellbore wall pipe 276 to return pipe 274. Valves (e.g., 232) and meters (e.g., 234) may be positioned with various sections of pipe (e.g., 280) to establish flows between wellbore wall pipe 276 and return pipe 274. The flow rates and pressures may be adjusted using the valves and tuned back on information obtained from the meters.

The valves may be manual and/or computer controlled. To simulate fluid flow distributions that may occur in a well, the operation of computer controlled valves of the simulation system may be modified over time to simulate a transient response of fluid flow through perforations in a well. For example, the computer controlled valves may be initially operated in an open manner and then may be constricted over time, or vice versa.

In addition to use of various valves to simulate conditions present in a well, pipes used in the perforation simulation sections 212 may be selected to recreate well conditions. For example, turning to FIG. 2F, which may show a third diagram of the second portion of the test bed in accordance with an embodiment, the size of pipe 181, the fluid from which it is constructed, and/or other aspects of pipe 181 may be selected to, for example, establish transient pressure responses of fluid flowing into and/or out of perforations.

Figure 2G:
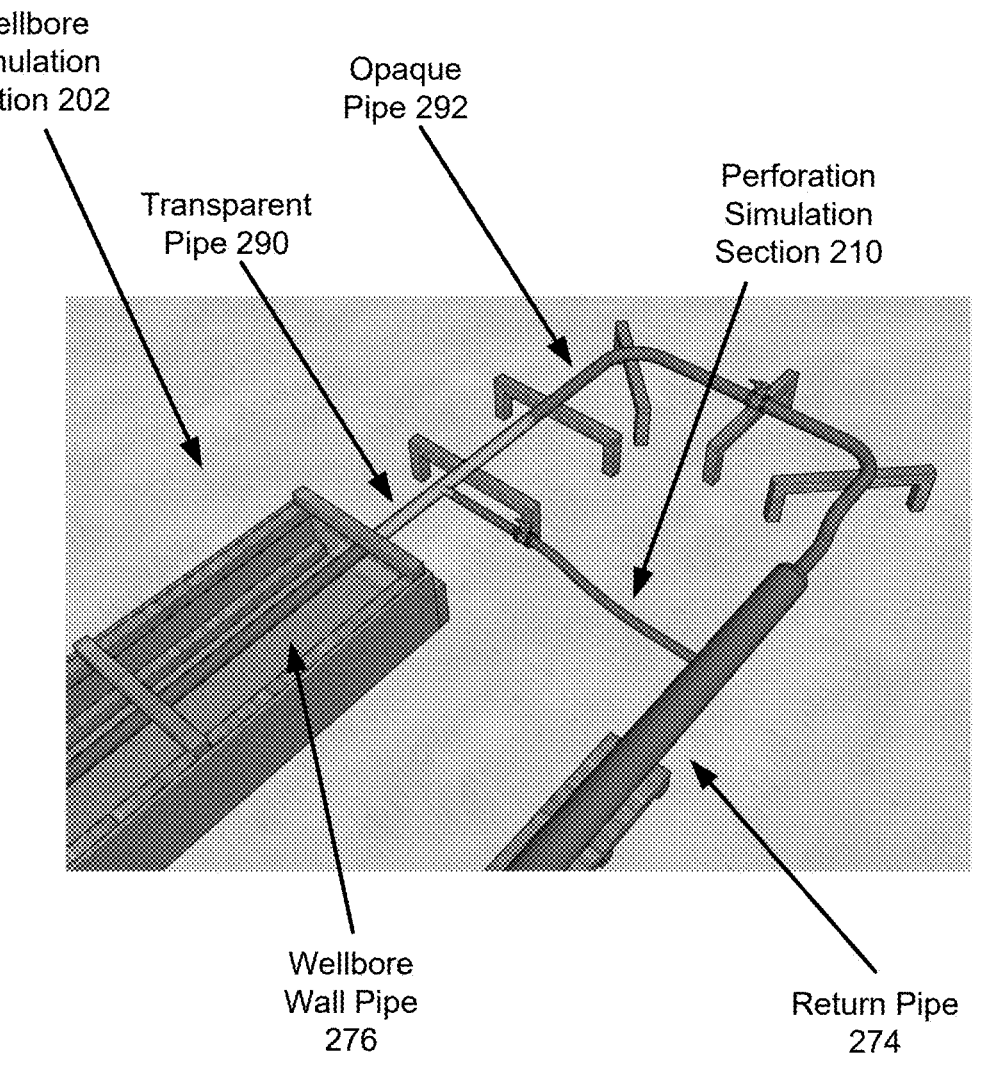

Turning to FIG. 2G, a fourth diagram of the second portion of the test bed in accordance with an embodiment is shown.

To characterize movement of data acquisition tools positioned in wellbore well pipes (e.g., 276), the wellbore wall pipe may connect to a transparent pipe (e.g., 290) and through which some of the data acquisition tool and nearby fluids may be imaged. While not shown in FIG. 2G, optical tools such as high speed cameras may be positioned near transparent pipe. Consequently, movement of the portion of the data acquisition tool while fluid flows through transparent pipe 290 may be measured, and/or measurements of fluid flows.

To simulate impacts of perforations near data acquisitions tools, a perforation simulation section (e.g., 210) may be positioned with transparent pipe 290. Consequently, complex fluid flows proximate to data acquisition tools may be established and corresponding responses may be observed. While described with respect to optical measurements, other measurement modalities may be used without departing from embodiments disclosed herein.

The fluid, after flowing through transparent pipe 290, may flow through other sections of pipe (e.g., opaque pipe 292) and into return pipe 274 for return to the fluid tank, thereby completing the circulation loop.

While illustrated in FIGS. 2A-2G with some example components, a test bed may include additional, fewer, and/or different components without departing from embodiments disclosed herein.

Additionally, any of the components may be elevated.

To further clarify embodiments disclosed herein, data flow diagrams in accordance with an embodiment are shown in FIGS. 3A-3E. In these diagrams, flows of data and processing of data are illustrated using different sets of shapes. A first set of shapes (e.g., 300, 302, etc.) is used to represent data structures, a second set of shapes (e.g., 306, 314, etc.) is used to represent processes performed using and/or that generate data, and a third set of shapes (e.g., 308, 316, etc.) is used to represent large scale data structures such as databases.

Figure 3A:
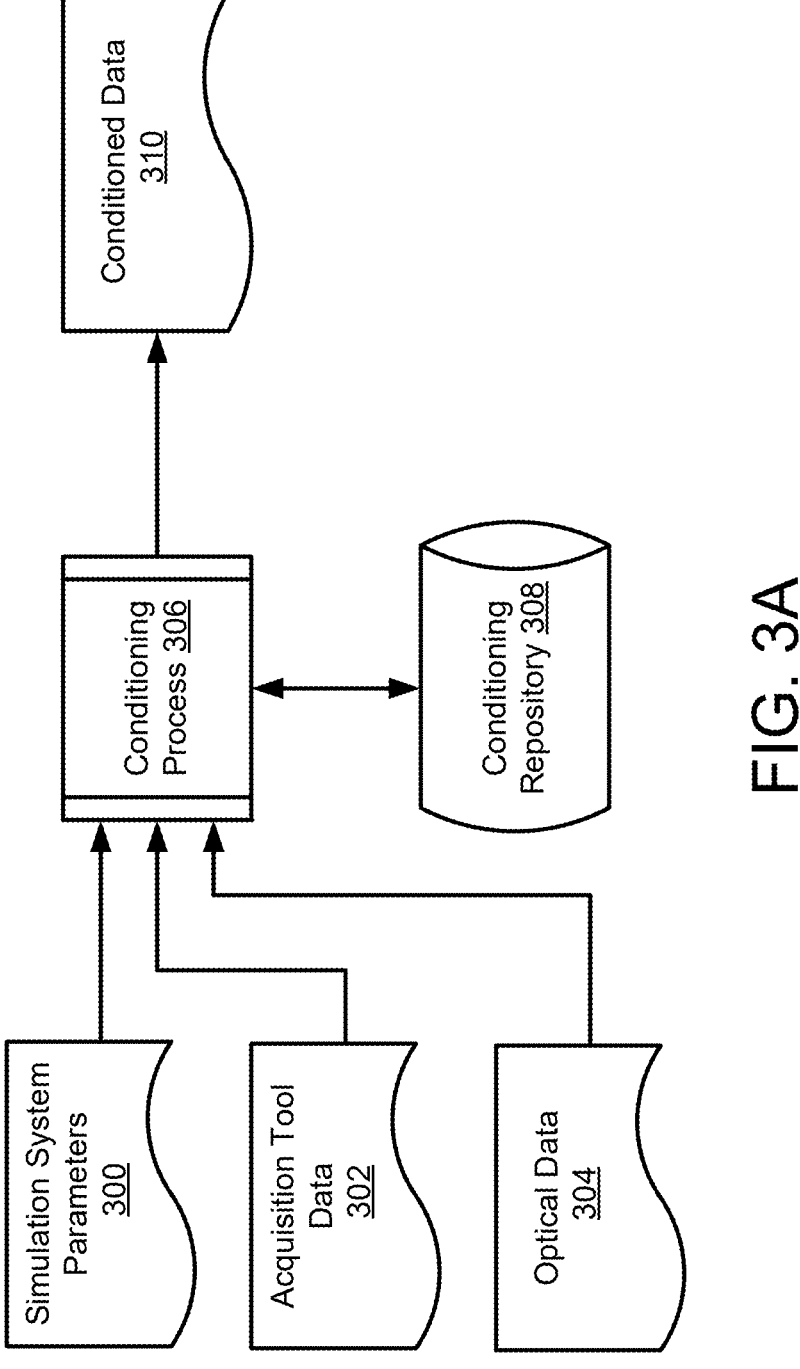
FIGS. 3A-3E show data flow diagrams illustrating data processing in accordance with an embodiment.
Figure 3B:
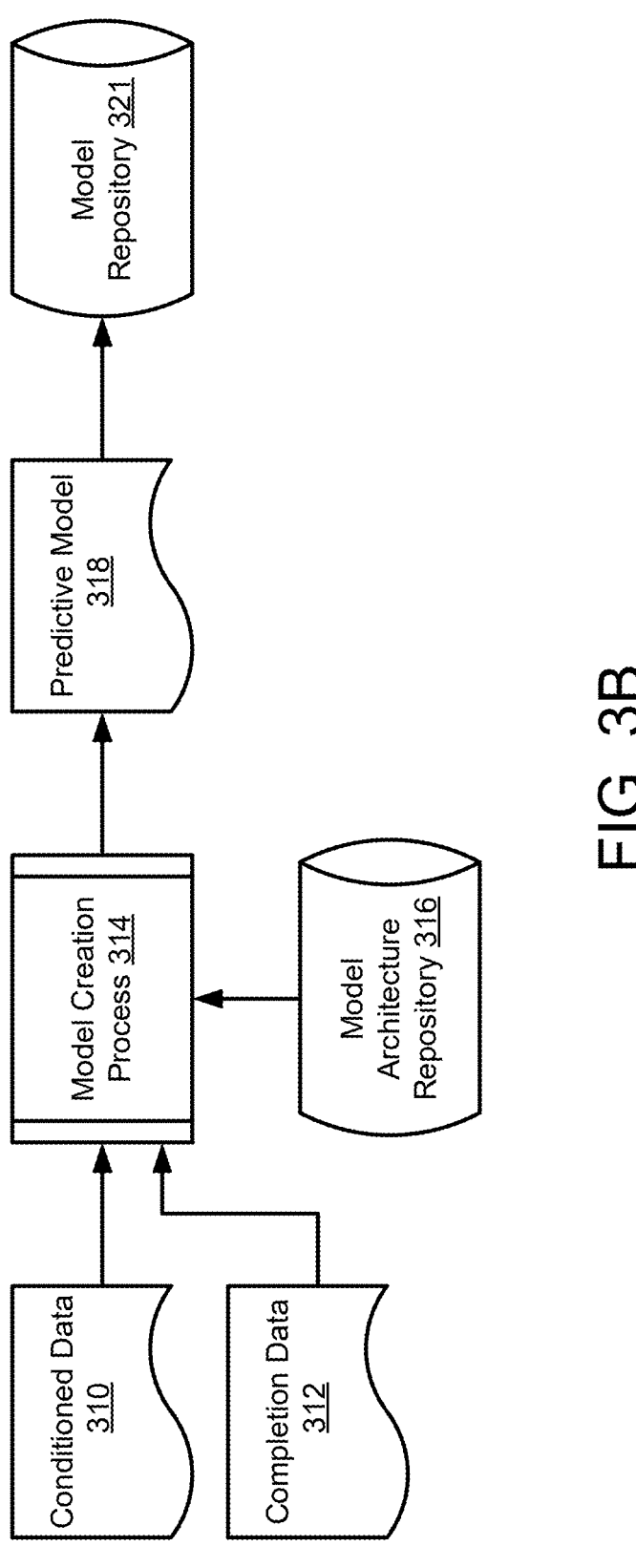
Figure 3C:
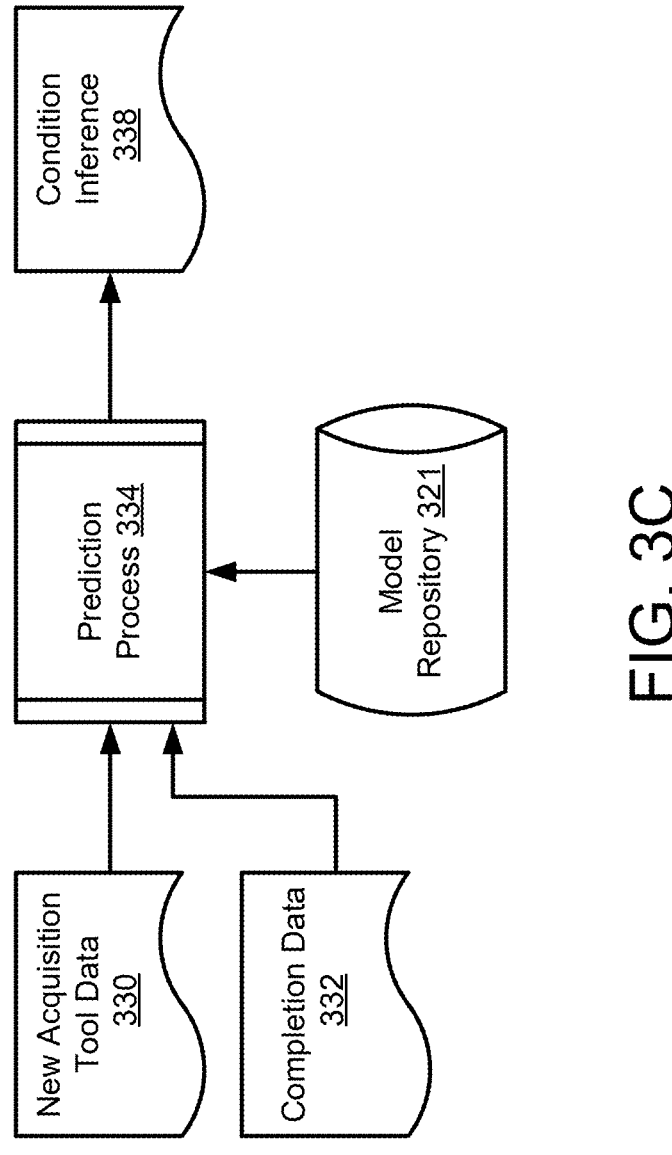

Turning to FIG. 3A, a first data flow diagram in accordance with an embodiment is shown. The first data flow diagram may illustrate data used in and data processing performed in preparing information regarding operation of a simulation system and data acquisition tool for analysis.

To prepare the information for analysis, conditioning process 306 may be performed. Prior to performance of condition process 306, a test bed may be operated under a variety of conditions specified by various simulation system parameters 300 to simulate different types of conditions that may be present in a well. During each operation to simulate different conditions, data acquisition tools may be characterized through measurement, thereby providing acquisition tool data 302 and optical data 304. Acquisition tool data 302 may include measurements recorded by the data acquisition tools, including for example a wireline cable with one or more optical fiber threads. Optical data 304 may include information regarding the position and motion of portions of the data acquisition tools over time (e.g., while the measurements of the data acquisition tools were taken). Optical data 304 may be recorded, for example, by a high-speed camera pointed at the transparent pipe section in test bed 154.

During conditioning process 306, acquisition tool data 302 and optical data 304 may be analyzed to (i) remove artifacts (and/or otherwise place it in a form for subsequent analysis) and/or (ii) remove or mitigate noise. To mitigate noise in the data, the test bed may be deactivated, and the acquisition tool may be characterized under these conditions. The measured data under these conditions may be used, for example, to identify noise levels present in the vicinity in which the testing is conducted, to set thresholds or other parameters for subsequent use of data, etc. The resulting conditioned data 310 may be in a form compatible with various analysis algorithms and through which models may be obtained.

During conditioning process 306, information from conditioning repository 308 may be utilized. For example, conditioning repository 308 may include information regarding required forms of data compatible with analysis algorithms, anomaly detection information usable to remove portions of acquisition tool data 302 and/or optical data 304 that is likely to be inaccurate (e.g., due to a measurement error or violation of an assumption regarding the measurement processes used to obtain the data), and/or other information usable to place acquisition tool data 302 and optical data 304 in a form that is more likely to be able to be successfully analyzed and used for model creation.

Turning to FIG. 3B, a second data flow diagram in accordance with an embodiment is shown. The second data flow diagram may illustrate data used in and data processing performed in model creation using conditioned data 310 and completion data 312.

To create models, model creation process 314 may be performed. During model creation process 314, predictive model 318 may be created using conditioned data 310 and completion data 312.

To create predictive model 318, conditioned data 310 (e.g., spatial acoustic strain data) may be additionally filtered to remove acoustic strain signals that are not related to fluid flows through perforations. These additional components of acoustic strain signals recorded by the optic fiber cable may be due to pumping noise, standing waves in the components of the test bed or the well, reflections dictated by the well or test pipe structure, and/or other factors unrelated to fluid flows. The procedure for removal of the acoustic strain components not related to fluid flows from perforations may be scalable and physics-based. That is, the same data filtration procedure is applied during a) data conditioning and training of the predictive model, taking into account the structure and physical properties of the test bed and b) the same data filtering model is applied during prediction of flow rate distribution based on the field measurements with the acquisition tool inside or outside of the subterranean well taking into account the completion and physical properties of the completion system.

To create predictive model 318, relationships in conditioned data 310 may be generalized. For example, a machine learning model, linear regression based model, decision tree, and/or other type of inference model may be trained using conditioned data 310. Predictive model 318 may be trained to predict well conditions based on (i) measurements of data acquisition tools positioned in the well and (ii) the completion of the well. For example, a measurement of a data acquisition tool in a well along with information regarding the well completion may be provided to predictive model 318. In response, the conditions that are likely to be present in the well (e.g., fluid flow rates in wellbore, into/out of perforations, etc.) may be output.

To facilitate model creation, model architecture repository 316 may include templates and/or other information usable to architect inference models. To facilitate accurate inferencing, multiple models of different architectures may be trained and then tested to identify which trained model most faithfully produces desirable inferences (e.g., reliable, accurate, etc.).

Once obtained, predictive model 318 may be stored in model repository 321 for future use. For example, models from model repository 321 may be deployed to surface facilitates, to data centers, and/or other locations to facilitate identification of properties likely to be found in wells.

Turning to FIG. 3C, a third data flow diagram in accordance with an embodiment is shown. The third data flow diagram may illustrate data used in and data processing performed in identifying conditions present in a well based on measurements and/or well completions.

When new acquisition tool data (e.g., 330) for a well having a completion defined by completion data 332 is obtained, the conditions present in the well that gave rise to the new acquisition tool data may be identified by performing prediction process 334. During prediction process 334, new acquisition tool data 330 and/or completion data 332 may be ingested by one or more inference models stored in model repository 321. It will be appreciated that the new acquisition tool data 330 and/or completion data may be raw or processed (e.g., subjected to noise removal procedures, and/or other procedures to improve the reliability/accuracy/ etc. of the data).

When new acquisition tool data 330, completion data 332, and/or other information is ingested, the inference models may produce, as output, condition inferences (e.g., 338) for conditions in the well to which the data acquisition tool from which new acquisition tool data 330 was obtained. The resulting condition inference 338 may specify, for example, flow rates of fluid along various portions of the well in which the data acquisition tool is positioned, temperatures along the various portions of the well, and/or other types of information that may be inferred from information obtained using the data acquisition tools positioned in the wells using the inference models.

Figure 3D:
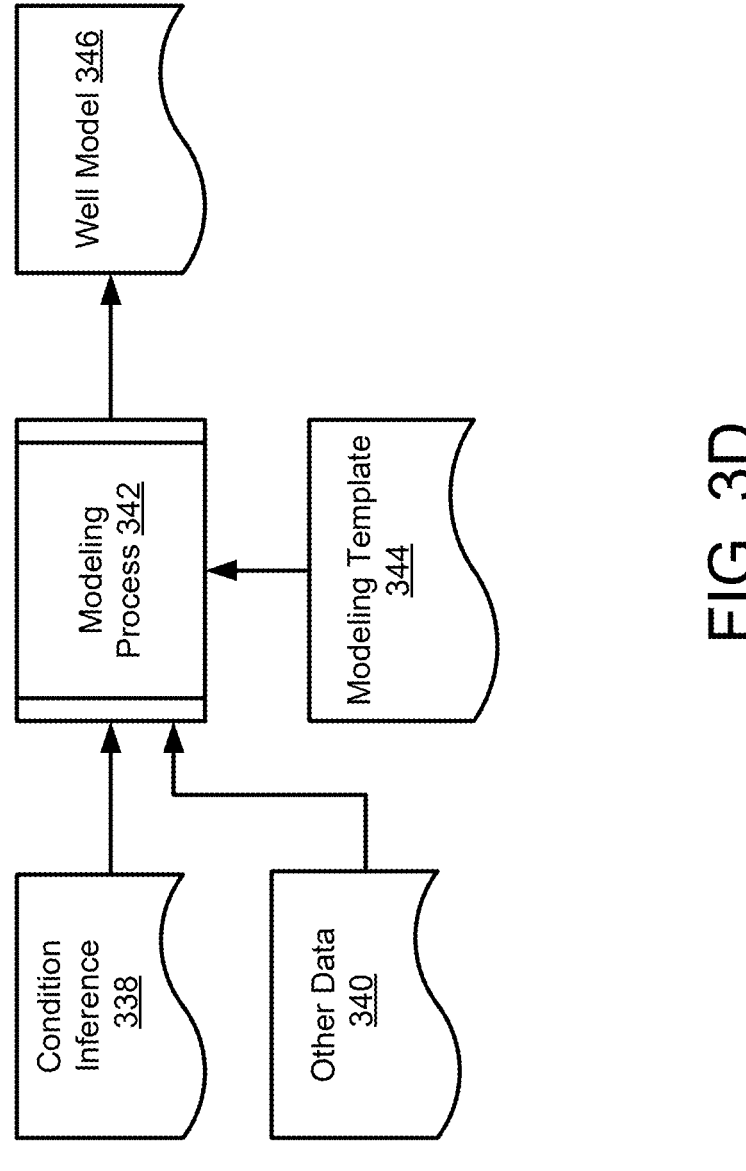

Turning to FIG. 3D, a fourth data flow diagram in accordance with an embodiment is shown. The fourth data flow diagram may illustrate data used in and data processing performed in obtaining well models (e.g., 346) usable to guide completion of the well to accomplish various goals (e.g., extract hydrocarbons, sequester materials, etc.).

To obtain well model 346, modeling process 342 may be performed. During modeling process 342, condition inference 338 and other data 340 may be ingested and used to generate well model 346.

Condition inference 338 may, as noted above, indicate conditions within a well. Condition inference 338 may also include assumptions and/or other information upon which the inferred conditions are based such as, for example, the completion of the well at the time a data acquisition tool was used to gather data regarding the well.

Other data 340 may include any quantity and type of information usable to establish models of wells. Other data 340 may include, for example, measurements of the well and/or surrounding geological formation using any number of measurement techniques, inferred conditions of the well and/or surrounding geological formation based on the measurements, etc.

To obtain well model 346, a modeling template (e.g., 344) may be populated using condition inference 338 and other data 340. Modeling template 344 may define an arrangement of portions of the aforementioned data with respect to one another. The arrangement may establish associations between different portions of the well and various measurements and/or inferred conditions in the portions of the well and/or surrounding geological formation. For example, using condition inference 338, flow rates of fluid at various locations within the well may be established, properties of perforations and/or the wellbore may be established, positions of various chokes and/or portions of the geological formation with respect to the well may be identified, and/or other information for well modeling may be added to well model 346. Other conditions other than flowrate of fluids may be identified and added to well model 346 via modeling process 342 without departing from embodiments disclosed herein.

The resulting well model 346 may be usable to identify portions of the well proximity to portions of the geological formation that are likely to support fluid flow, pressures/ flowrates/operating points for pumps that are likely to be necessary to cause desired operation of the well, and/or other information usable to ascertain how to operate a well to meet any number of goals may be ascertained.

Figure 3E:
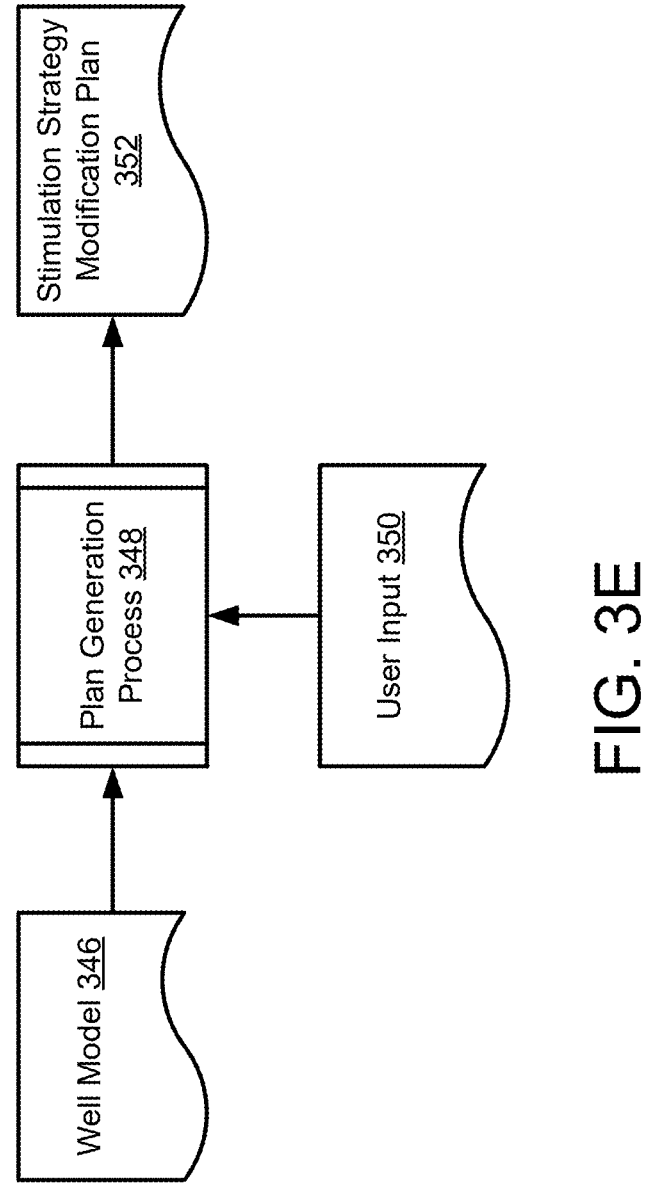

Turning to FIG. 3E, a fifth data flow diagram in accordance with an embodiment is shown. The fifth data flow diagram may illustrate data used in and data processing performed in obtaining a stimulation strategy modification plan (e.g., 352) usable to complete a well to accomplish various goals.

To obtain stimulation strategy modification plan 352, plan generation process 348 may be performed. During plan generation process 348, well model 346 may be analyzed to identify how various modifications to the stimulation strategy, various methods for operating the well, and/or how changes to other aspects of the well are likely to impact the well.

For example, well model 346 may be ingested into a simulation engine or other type of analysis tool. During use of well model 346, various types of user input 350 may be obtained. User input 350 may include input provided by a user tasked with obtaining stimulation strategy modification plan 352. User input 350 may indicate that various functions of the simulation engine are to be activated, various types of information are to be presented, specific types of modifications are to be simulated, etc. While described with respect to user input 350 for explanatory purposes, various types of automated input (e.g., a software agent) may also be ingested by plan generation process 348 and may be used in analysis of the well to obtain stimulation strategy modification plan 352.

The aforementioned process may allow for a user or automated system to identify, simulation, and select various modifications for the stimulation strategies. The selected modification may then be used to generate stimulation strategy modification plan 352. Stimulation strategy modification plan 352 may include information indicating any number of actions to be performed to modify the well to place the well in condition to meet various goals.

Once obtained, stimulation strategy modification plan 352 may be used to complete a well. For example, all or a portion of the actions specified by stimulation strategy modification plan 352 may be relayed to and performed by a surface facility to modify and/or operate the well.

Once the actions are performed, the modified well may be used, for example, to produce hydrocarbon resources, sequester fluids, extract energy resources, etc. It will be appreciated that the modified well may be used for other purposes without departing from embodiments disclosed herein.

Any of the data flows shown in FIGS. 3A-3E may be performed by any of the components illustrated in FIGS. 1A-2G. Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 4A:
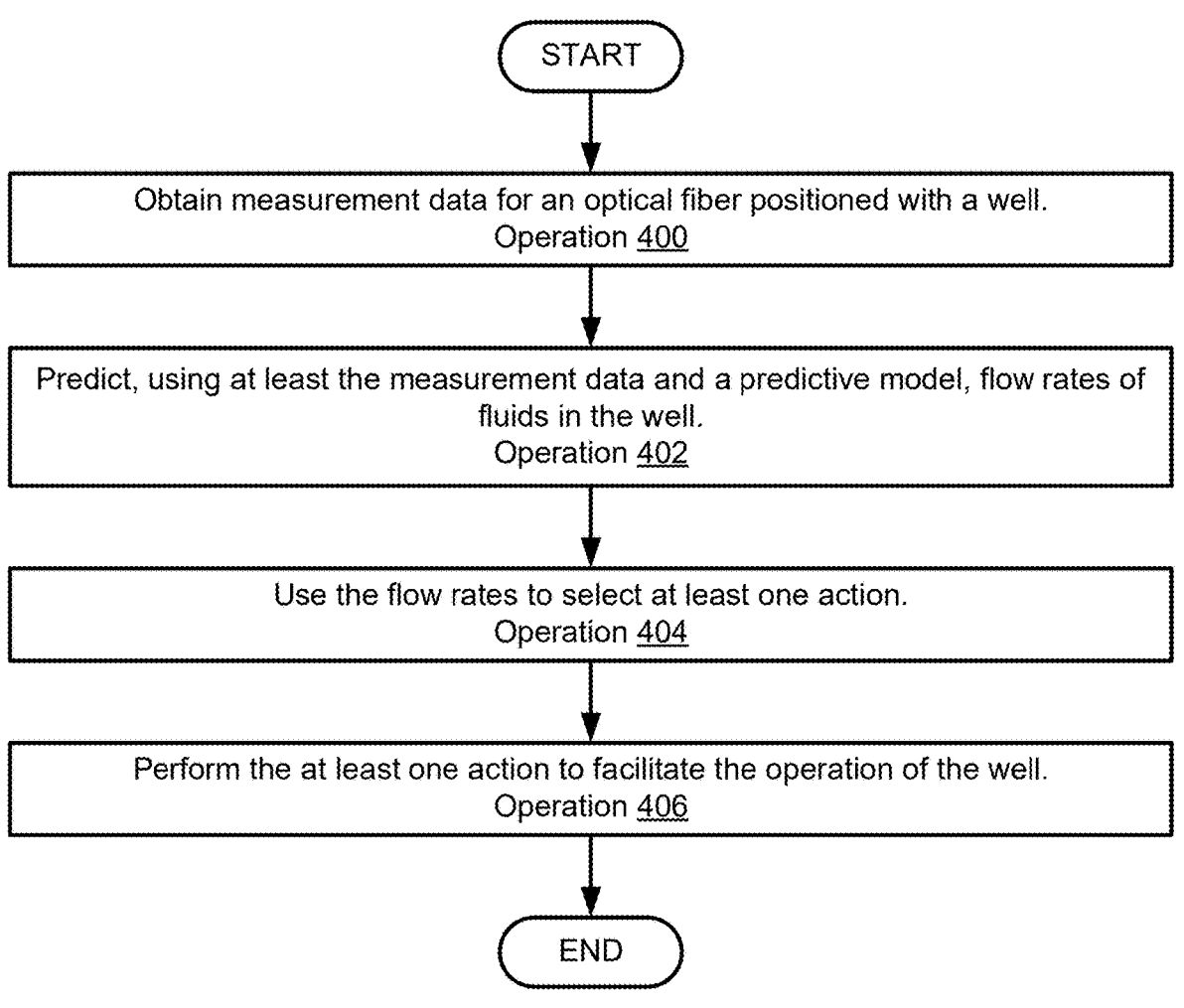
FIGS. 4A-4B shows flow diagrams illustrating methods in accordance with an embodiment.
Figure 4B:
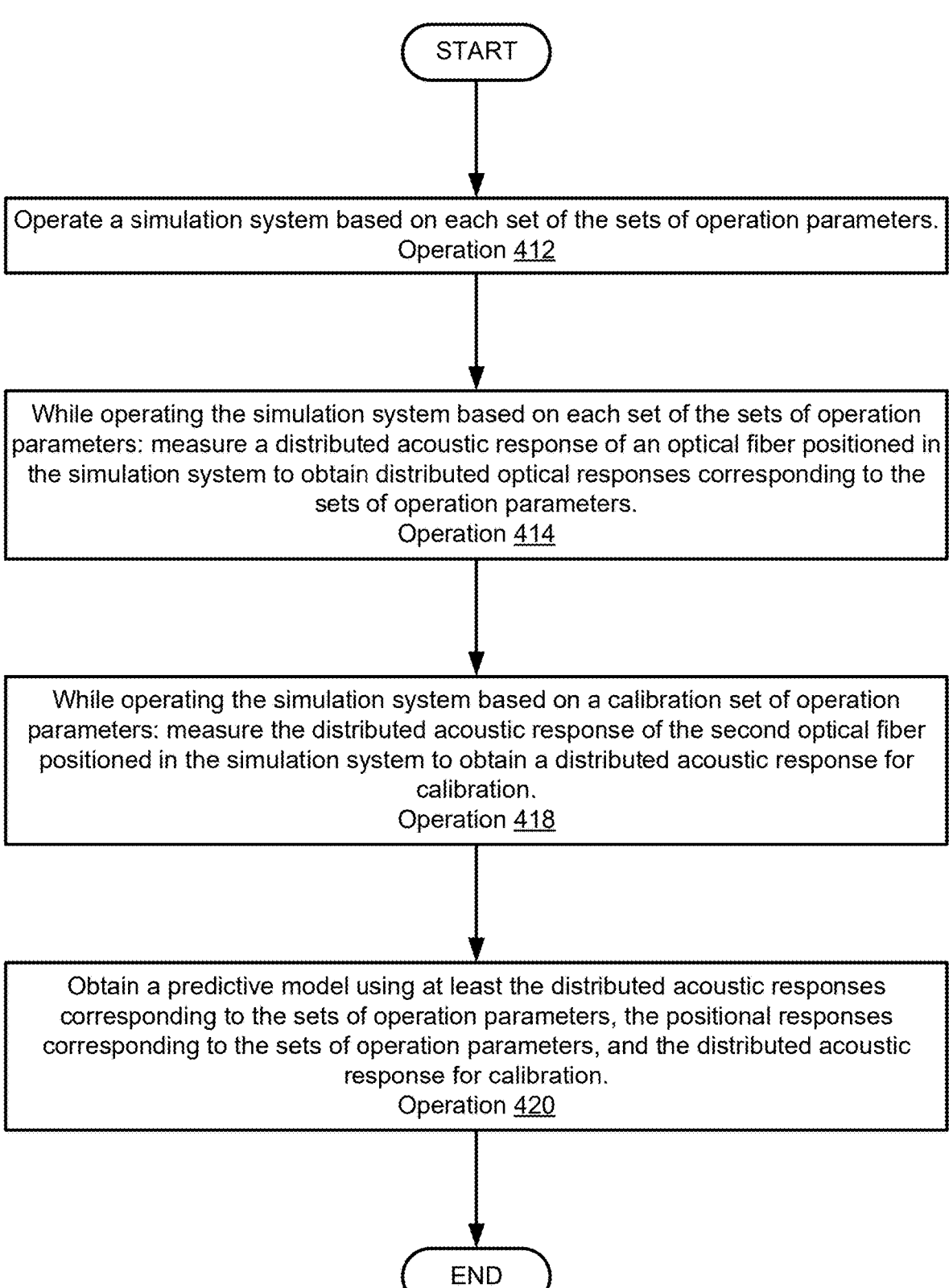

As discussed above, the components of FIG. 2. 1A-1C may perform various methods to facilitate characterization and creation of stimulation strategy modification plan of the well. FIGS. 4A-4B illustrate methods that may be performed by the components of the system of FIGS. 1A-1C. In the diagram discussed below and shown in FIGS. 4A-4B, any of the operations may be repeated, performed in different orders, and/or performed in parallel with or in a partially overlapping in time manner with other operations.

Turning to FIG. 4A, a first flow diagram illustrating a method for managing modification of a stimulation strategy modification plan in accordance with an embodiment is shown. The method may be performed, for example, by any of planning system 130, analysis system 140, well simulation system 150, and/or other components of the system shown in FIGS. 1A-2G.

At operation 400, measurement data for an optical fiber positioned in a wellbore of a well is obtained. The measurement data may be obtained by measuring a distributed acoustic response along the optical fiber. The distributed acoustic response may be measured by injecting optical radiation. The distributed acoustic response may be reflections of the optical radiation from different portions of the optical fiber.

The optical fiber may be one of multiple optical fibers. Any of the optical fibers may be adapted for use in distributed acoustic sensing and/or distributed temperature sensing. Any of the optical fibers may be adapted to modify is characteristics such as index of refraction based on conditions to which various portions of the optical fibers are exposed. Thus, the different portions may have different properties that correspond to spatially distributed conditions in the well.

At operation 402, flow rates of fluids in the well are predicted using at least the measurement data and a predictive model. The flow rates through the perforations may be predicted by ingesting at least the measurement data into the predictive model. The predictive model may output the flow rates through the perforations based on the input.

The flow rates may be predicted, in part, by relating the acoustic strains inferred by the optical fiber that are due to flows of fluids proximate to the optical fiber to obtain an estimate of spatial distribution of fluid flows. For example, an analytical model may be used to estimate strain based on the measurements of data acquisition tools. The spatial acoustic strain may be the acoustic strains at different positions along the optical fiber. The spatial distribution of acoustic strain may be ingested by the predictive model (e.g., in addition to or alternatively to the measurements) to obtain fluid flow predictions.

While described with respect to flow rates, the predictive model may provide predictions for other conditions proximate to the optical fiber in the well.

The predictive model may be any type of inference model such as, for example, a trained machine learning model, a regression model, a trained decision tree, neural network, etc. The predictive model may take additional information as input, beyond the measurement data. Refer to FIG. 4B for information regarding how the predictive model may be obtained.

At operation 404, the flow rates are used to select at least one action to be performed to stimulate the well. The action may be selected by (i) establishing a well model, (ii) using the well model to estimate how stimulation of the well is likely to impact operation of the well, and (iii) selecting the at least one action based on the changes, the impact of the changes, and one or more goals for operation of the well. For example, the well may be investigated by a subject matter expert using the well model. The subject matter expert may use the well model to estimate impacts of various changes on the well and identify how well the changes align with the one or more goals. Once sufficient alignment is identified, the subject matter expert (or automated process) may select the at least one action corresponding to the modification with sufficient alignment with the one or more goals.

At operation 406, the at least one action is performed to facilitate the operation of the well. The at least one action may be performed by, for example, establishing a stimulation strategy modification plan based on the at least one action and directing that the stimulation strategy modification plan for the stimulation be performed (e.g., by automated systems, by work crews manning the well site, etc.).

The method may end following operation 406.

Thus, the via the method illustrated in FIG. 4A, a well may be stimulated in a manner that is more likely to result is operation of the well in a manner that aligns with one or more goals. By utilizing inferred condition of the well based on the measurement data, the selected stimulation may be more likely to result in alignment of the actual operation of the modified well with the one or more goals.

Thus, the via the method illustrated in FIG. 4A, a well stimulation design may be modified in a manner that aligns with the current measurements results.

Turning to FIG. 4B, a second flow diagram illustrating a method obtaining predictive models usable to infer conditions in wells in accordance with an embodiment is shown. The method may be performed, for example, by any of planning system 130, analysis system 140, well simulation system 150, and/or other components of the system shown in FIGS. 1A-2G.

At operation 412, the simulation system is operated based on sets of operation parameters. The simulation system may be operated by setting the operation of various active components of the simulation system based on portions of the operation parameters. For example, the sets of parameters may specify, for example, flow rates, temperatures, and/or other conditions to be reproduced by the simulation system. To create these conditions, various pumps, valves, and/or other active components may be operated accordingly. The actual conditions created by the simulation system may be measured (e.g., using meters) and/or inferred based on operation of the active components. Feedback loops and/or other control methods may be used to faithfully reproduce the conditions that are to be simulated based on each respective set of operation parameters.

At operation 414, while the simulation system is operated based on each of the sets of operation parameters, a distributed optical response of an optical fiber positioned in the simulation system is measured to obtain distributed optical responses corresponding to each set of the sets of operation parameters. To obtain the distributed optical responses, the optical fiber may be activated and the response may be measured. Thus, relationships between simulated well conditions and measurements of data acquisition tools in the form of distributed optical responses may be obtained.

At operation 418, while the simulation system is operated based on a calibration set of operation parameters, a distributed acoustic response of the optical fiber positioned in the simulation system is measured to obtain a distributed acoustic response for calibration. The optical cable response may be measured while exposed to the conditions in the simulation system during operation based on the calibration set of operation parameters. The calibration operation parameters may be for the active components of the simulation system to be off to obtain a baseline measurement that reflects noise present in the environment in which the simulation system operates.

At operation 420, a predictive model is obtained using at least the distributed acoustic responses corresponding to the sets of operation parameters, and the distributed acoustic response for calibration. The predictive model may be obtained by (i) using the distributed acoustic response for calibration to mitigate noise present in the distributed acoustic responses corresponding to the sets of operation parameters to obtain conditioned distributed acoustic responses corresponding to the sets of operation parameters, and (ii) training an untrained predictive model using at least the conditioned distributed acoustic responses corresponding to the sets of operation parameters (e.g., associations between the distributed optical responses and the set of operation parameters).

The trained predictive model may be stored for future use, along with information regarding how the trained predictive model may be used (e.g., any assumptions made about the completion of the well, position of an optical fiber in the well, type/structure of optical fiber used for downhole data collection, types of measurements to be obtained using the optical fiber, etc.). Any number of trained predictive models may be obtained in this manner based on varying assumptions to establish a library of trained predictive models usable to infer conditions in wells of varying completion.

The method may end following operation 420.

Thus, using the methods illustrated in FIG. 4B, various predictive models may be established to facilitate well stimulation strategy identification.

By doing so, embodiments disclosed herein may improve the likelihood of successfully exploiting geological formations and corresponding wells for various purposes. The likelihood of success may be improved by enabling spatially distributed conditions in a well to be identified. The identified conditions may facilitate modeling and understanding how various geological formation and corresponding wells may respond to certain uses, stimulations, etc.

Thus, embodiments disclosed herein may address the technical challenge of identification of how wells may be stimulated and/or operated to achieve various goals. The disclosed embodiments may do so by enabling information regarding conditions present in the well to be identified and used in selection of stimulation strategy and operation of wells.

Figure 5:
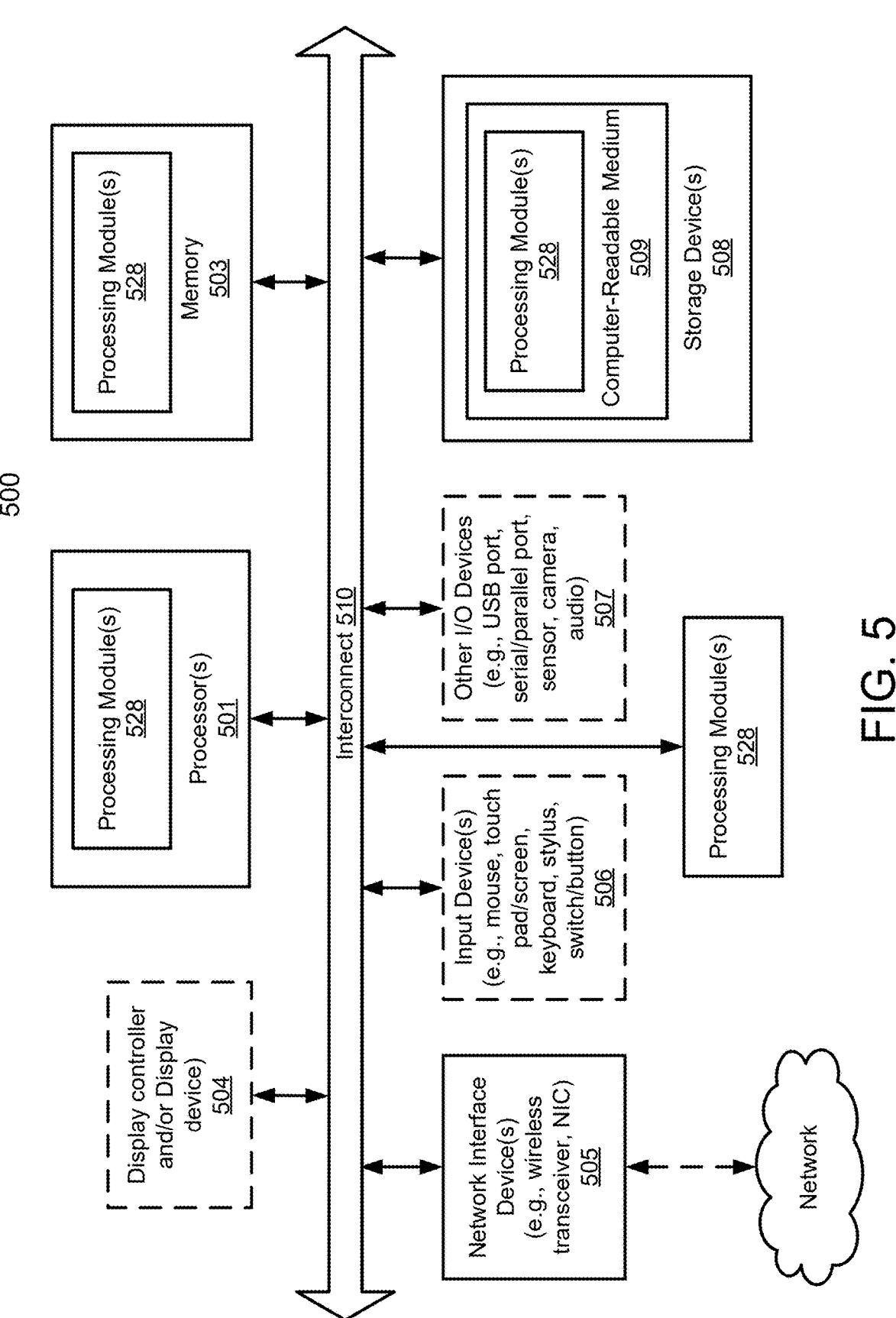
FIG. 5 shows a block diagram illustrating a data processing system in accordance with an embodiment.

Any of the components illustrated in FIGS. 1-4B may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In an embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in an embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as Vx Works.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In an embodiments, to enable a thinner and lighter system design as well as to improve system responsiveness, this mass storage may be implemented via a solid state device (SSD). In an embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for stimulating a well, the method comprising:

obtaining measurement data for an optical fiber positioned with the well, wherein the measurement data comprises:

a first portion of optical measurements spatially distributed along the optical fiber while a simulated fluid flow is proximate to the optical fiber; and a second portion of position measurements of the optical fiber during the simulated fluid flow;

predicting, using at least the measurement data and a predictive model, flow rates of fluids in the well, wherein the predictive model is based on:

a structure of a simulation system for the well; and sets of operation parameters for the simulation system; and measurements data from multiple optical fiber threads inside an optical cable positioned in the simulation system while the simulation system is operated under the sets of operation parameters;

using the flow rates to select at least one action wherein the at least one action includes modifying the well to produce hydrocarbon resources, sequester fluids or extract energy resources; and performing the at least one action to facilitate stimulation of the well.

2. The method of claim 1, wherein the optical fiber has optical properties adapted to change with respect to the simulated fluid flow.

3. The method of claim 1, wherein the measurement data further comprises:

a third portion of optical measurements spatially distributed along the optical fiber without the simulated fluid flow.

4. The method of claim 1, wherein the sets of operation parameters comprises a first set of operation parameters, and the first set of operation parameters comprise:

a flowrate of a fluid out of a perforation section in fluid communication with a wellbore simulation section of the simulation system.

5. The method of claim 4, wherein the first set of operation parameters further comprises:

a flowrate of the fluid out of a second perforation section in fluid communication with the wellbore simulation section.

6. The method of claim 1, wherein the structure is based on a potential well completion, the completion comprising a first section corresponding to a wellbore and a second section corresponding to a perforation.

7. The method of claim 1, further comprising:

prior to obtaining the measurement data:

establishing the sets of operation parameters; and operating the simulation system based on each set of the sets of operation parameters.

8. The method of claim 1, wherein the simulation system is used to simulate oil, gas, or gas condensate wells.

9. The method of claim 1, wherein the simulation system is used to simulate the well for $CO_2$ sequestration.

10. The method of claim 1, wherein the simulation system is used to simulate a geothermal well.

11. The method of claim 1, further comprising:

prior to obtaining the measurement data, obtaining the predictive model using at least the measurements data including distributed optical responses corresponding to the sets of operation parameters, and a calibration distributed optical response.

12. The method of claim 11, wherein the predictive model is a machine learning model trained to generalize relationships between the distributed optical responses corresponding to the sets of operation parameters normalized to the calibration distributed optical response.

13. The method of claim 12, wherein the calibration distributed optical response serves as a baseline for noise in an environment for the distributed optical responses corresponding to the sets of operation parameters.

14. A simulation system for wells, the simulation system comprising:

a circulation loop for circulating a fluid to simulate flows of fluid in a well;

a data acquisition tool positioned with the circulation loop to interact with the fluid;

a controller configured to obtain a distributed optical response from the data acquisition tool while the data acquisition tool is positioned in the circulation loop and the fluid is circulated in the circulation loop; and a simulation system controller adapted to update operation of the simulation system based on sets of operation parameters, wherein the sets of operation parameters define at least flow rates of the fluid in the circulation loop, and wherein a first set of the sets of operation parameters reduces the flow rates of the fluid to mitigate effects of the simulation system on the data acquisition tool and enable a baseline measurement of conditions impacting the data acquisition tool to be acquired.

15. The simulation system of claim 14, wherein the circulation loop comprises:

a wellbore simulation section in which the data acquisition tool is positioned;

a return section in fluid communication with the wellbore simulation section and a fluid tank; and a perforation simulation section that places a first portion of the wellbore simulation section in fluid communication with a portion of the return section so that at least a portion of the fluid bypasses a second portion of the wellbore simulation section while the fluid is circulated in the circulation loop.

16. The simulation system of claim 15, wherein the circulation loop further comprises:

a surface facility simulation section adapted to selectively establish circulations of the fluid in the circulation loop.

17. The simulation system of claim 14, wherein the data acquisition tool comprises an optical fiber.

18. The simulation system of claim 17, wherein the distributed optical response is usable to identify a distributed strain along the optical fiber, a distributed temperature along the optical fiber, and/or a distributed acoustic signal along the optical fiber.

19. The simulation system of claim 14, wherein other sets of the sets of operation parameters simulate conditions present in the well in which the data acquisition tool is positioned.

20. The simulation system of claim 19, further comprising:

a pump to pump the fluid in the circulation loop;

a set of valves to limit a flow rate of the fluid in the circulation loop; and set of flowmeters to measure the flow rate.

21. The simulation system of claim 20, wherein the pump, the set of valves, and the set of flowmeters are operably connected to and managed by the simulation system controller.

22. The simulation system of claim 14, further comprising:

a noise management system positioned with a portion of the circulation loop to shield the portion of the circulation loop from ambient noise, wherein the data acquisition tool is positioned with the portion of the circulation loop during operation of the simulation system.

23. The simulation system of claim 14, further comprising:

a heater positioned with the circulation loop to heat at least a portion of the fluid; and a temperature sensor to measure a temperature of the portion of the fluid.

24. The simulation system of claim 14, wherein the controller is configured to obtain a distributed acoustic signal along the data acquisition tool and a distributed temperature signal along the data acquisition tool.

25. The simulation system of claim 24, wherein the data acquisition tool comprises two optical fibers, and the distributed acoustic signal and the distributed temperature signal are obtained from the respective two optical fibers.

26. The simulation system of claim 24, wherein the data acquisition tool comprises a multimode optical fiber, and both the distributed acoustic signal and the distributed temperature signal are obtained from the multimode optical fiber.

27. The simulation system of claim 14, wherein the data acquisition tool is positioned in the circulation loop and/or outside of the circulation loop.

28. A simulation system for wells, the simulation system comprising:

a circulation loop for circulating a fluid to simulate flows of fluid in a well;

a data acquisition tool positioned with the circulation loop to interact with the fluid; and a controller configured to obtain a distributed optical response from the data acquisition tool while the data acquisition tool is positioned in the circulation loop and the fluid is circulated in the circulation loop, wherein the circulation loop comprises:

a wellbore simulation section in which the data acquisition tool is positioned;

a return section in fluid communication with the wellbore simulation section and a fluid tank; and a perforation simulation section that places a first portion of the wellbore simulation section in fluid communication with a portion of the return section so that at least a portion of the fluid bypasses a second portion of the wellbore simulation section while the fluid is circulated in the circulation loop.

29. The simulation system of claim 28, wherein the circulation loop further comprises:

a surface facility simulation section adapted to selectively establish circulations of the fluid in the circulation loop.

30. The simulation system of claim 28, wherein the data acquisition tool comprises an optical fiber.

31. The simulation system of claim 28, further comprising:

a noise management system positioned with the wellbore simulation section to shield the wellbore simulation section from ambient noise, wherein the data acquisition tool is positioned with the noise management system during operation of the simulation system.

* * * * *